(12) United States Patent
Kawachiya et al.

(10) Patent No.: US 11,275,665 B2
(45) Date of Patent: Mar. 15, 2022

(54) ANALYSIS SYSTEM

(71) Applicant: Hitachi, Ltd., Tokyo (JP)

(72) Inventors: Yoichi Kawachiya, Tokyo (JP);
Masakazu Takahashi, Tokyo (JP);
Keiro Muro, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/002,965

(22) Filed: Aug. 26, 2020

(65) Prior Publication Data

US 2021/0182167 A1 Jun. 17, 2021

(30) Foreign Application Priority Data

Dec. 16, 2019 (JP) .............................. JP2019-226541

(51) Int. Cl.
*G06F 9/44* (2018.01)
*G06F 11/32* (2006.01)
*G06F 11/34* (2006.01)

(52) U.S. Cl.
CPC ........ *G06F 11/323* (2013.01); *G06F 11/3409* (2013.01); *G06F 11/3466* (2013.01)

(58) Field of Classification Search
None
See application file for complete search history.

(56) References Cited

U.S. PATENT DOCUMENTS

| | | | |
|---|---|---|---|
| 2007/0022068 A1* | 1/2007 | Linsker | G05B 13/026 706/23 |
| 2007/0255512 A1* | 11/2007 | Delenstarr | G16B 50/00 702/35 |
| 2012/0093359 A1* | 4/2012 | Kurien | G06K 9/00993 702/150 |
| 2013/0173596 A1* | 7/2013 | Roediger | G06Q 10/08 707/722 |

FOREIGN PATENT DOCUMENTS

JP 2012-103848 A 5/2012

* cited by examiner

*Primary Examiner* — Qamrun Nahar
(74) *Attorney, Agent, or Firm* — Mattingly & Malur, PC

(57) ABSTRACT

A traceability estimation unit generates batch combination output data configured by a plurality of combinations of a batch in the first process and a batch in the second process, and the feature of the batch. The traceability estimation unit estimates the combination of the batch in the first process and the batch in the second process, which is used as traceability, from the plurality of the combinations of the batches in the batch combination output data by using the feature.

12 Claims, 31 Drawing Sheets

F I G. 5
PRODUCTION MANAGEMENT INFORMATION DATA 150

| PROCESS NUMBER | MANAGEMENT NUMBER | BATCH NUMBER | WORK START TIME | WORK END TIME | PRODUCTION AMOUNT |
|---|---|---|---|---|---|
| 1 | P | A | 2019/6/1 9:14:14 | 2019/6/1 9:21:39 | 100 |
| 1 | P | B | 2019/6/1 9:28:50 | 2019/6/1 9:32:43 | 30 |
| 1 | Q | C | 2019/6/1 9:41:55 | 2019/6/1 9:45:19 | 80 |
| 1 | Q | D | 2019/6/1 9:50:41 | 2019/6/1 9:55:01 | 80 |
| 2 | P | X | 2019/6/1 10:44:41 | 2019/6/1 10:52:13 | 60 |
| 2 | P | Y | 2019/6/1 11:24:17 | 2019/6/1 11:35:29 | 70 |
| ⋮ | ⋮ | ⋮ | ⋮ | ⋮ | ⋮ |

F I G. 6
SENSOR DATA 151

| PROCESS NUMBER | TIME | CURRENT | TEMPERATURE | PRESSURE |
|---|---|---|---|---|
| 1 | 2019/6/1 9:14:31 | 10.1 | 15.5 | 10.1 |
| 1 | 2019/6/1 9:14:32 | 10.2 | 15.5 | 10 |
| 1 | 2019/6/1 9:14:33 | 10.1 | 15.5 | 9.8 |
| 1 | 2019/6/1 9:14:34 | 10.3 | 15.4 | 9.9 |
| 1 | 2019/6/1 9:14:35 | 10.0 | 15.4 | 9.9 |
| 1 | 2019/6/1 9:14:36 | 10.1 | 15.4 | 10 |
| 1 | 2019/6/1 9:14:37 | 10.1 | 15.4 | 9.9 |
| ⋮ | ⋮ | ⋮ | ⋮ | ⋮ |

FIG. 7
TRACEABILITY DATA

| MANAGEMENT NUMBER | PROCESS NUMBER | BATCH NUMBER |
|---|---|---|
| P | 1 | A |
| P | 1 | B |
| P | 2 | X |
| P | 2 | Y |
| Q | 1 | C |
| Q | 2 | W |
| Q | 2 | Z |
| ... | ... | ... |

FIG. 8
FEATURE DATA

| MANAGEMENT NUMBER | PROCESS NUMBER | BATCH NUMBER | WORK START TIME | WORK END TIME | PRODUCTION AMOUNT | ... | CURRENT AVERAGE | CURRENT MAXIMUM | CURRENT MINIMUM |
|---|---|---|---|---|---|---|---|---|---|
| P | 1 | A | 2019/6/1 9:14:31 | 2019/6/1 9:34:22 | 100 | ... | 10.1 | 11.9 | 9.0 |
| P | 1 | B | 2019/6/1 9:36:12 | 2019/6/1 9:54:27 | 30 | ... | 10.8 | 11.9 | 9.1 |
| Q | 1 | C | 2019/6/1 9:58:26 | 2019/6/1 9:14:31 | 80 | ... | 8.4 | 10.9 | 8.2 |
| ... | ... | ... | ... | ... | ... | ... | ... | ... | ... |

FIG. 9

PREDICTION CURVE DATA 154

| PROCESS NUMBER_UPSTREAM | FEATURE_UPSTREAM | PROCESS NUMBER_DOWNSTREAM | FEATURE_DOWNSTREAM | PREDICTION CURVE SHAPE |
|---|---|---|---|---|
| 1 | CURRENT | 2 | TEMPERATURE | EXPONENTIAL FUNCTION |
| 1 | CURRENT | 2 | PRESSURE | LINEAR |
| 2 | OPERATION TIME | 4 | PRESSURE | |
| ... | ... | ... | ... | ... |

FIG. 10

RESTRICTION CONDITION DATA 155

| PROCESS NUMBER_UPSTREAM | PROCESS NUMBER_DOWNSTREAM | RESTRICTION CONDITION |
|---|---|---|
| 1 | 2 | MANY-TO-ONE |
| 1 | 3 | ONE-TO-ZERO NONE |
| 2 | 3 | — |
| 1 | 4 | PRODUCTION AMOUNT |
| 2 | 4 | ONLY FORWARD OR REVERSE ORDER |
| 3 | 5 | MANY-TO-MANY |
| ... | ... | ... |

FIG. 11

TRACEABILITY PROBABILITY DISTRIBUTION DATA
(PROCESS NUMBER 1, 2, AND MANAGEMENT NUMBER P) 156

| (A, X) | (A, Y) | (B, X) | (B, Y) | PROBABILITY |
|---|---|---|---|---|
| 1 | 1 | 1 | 1 | 0.11 |
| 1 | 1 | 1 | 0 | 0.55 |
| 1 | 1 | 0 | 1 | 0.01 |
| 1 | 0 | 1 | 1 | 0.20 |
| 0 | 1 | 0 | 1 | 0.04 |
| 1 | 1 | 0 | 0 | 0.03 |
| 1 | 0 | 1 | 0 | 0.06 |

F I G. 1 2

FEATURE LIBRARY TABLE 157

| PROCESS | SENSOR NAME | CALCULATION METHOD |
|---|---|---|
| 1 | CURRENT | MAXIMUM |
| 1 | CURRENT | MINIMUM |
| 1 | CURRENT | AVERAGE |
| 1 | CURRENT | DISTRIBUTION |
| 1 | CURRENT | MEDIAN VALUE |
| 1 | CURRENT | MAXIMUM − MINIMUM |
| 1 | CURRENT | FREQUENCY |
| 1 | CURRENT | TIME INTEGRATION |
| 1 | TEMPERATURE | MAXIMUM |
| 1 | TEMPERATURE | MINIMUM |
| 1 | TEMPERATURE | AVERAGE |
| 1 | TEMPERATURE | DISTRIBUTION |
| 1 | TEMPERATURE | MEDIAN VALUE |
| 1 | TEMPERATURE | INCLINATION |
| 1 | TEMPERATURE | MAXIMUM VALUE SECTION |
| 2 | PRESSURE | INCLINATION |
| 2 | PRESSURE | TIME INTEGRATION |
| ... | ... | ... |

F I G. 1 5
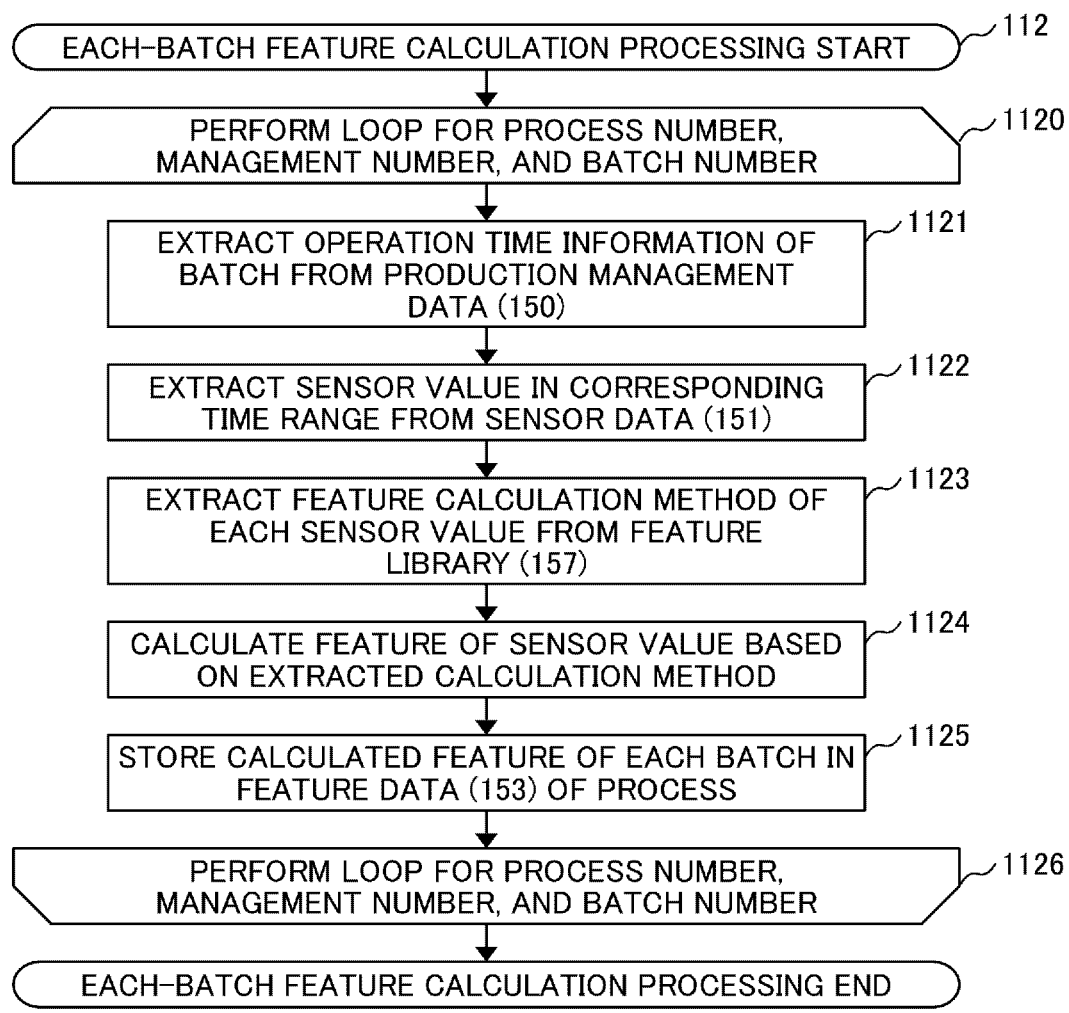

F I G. 1 6
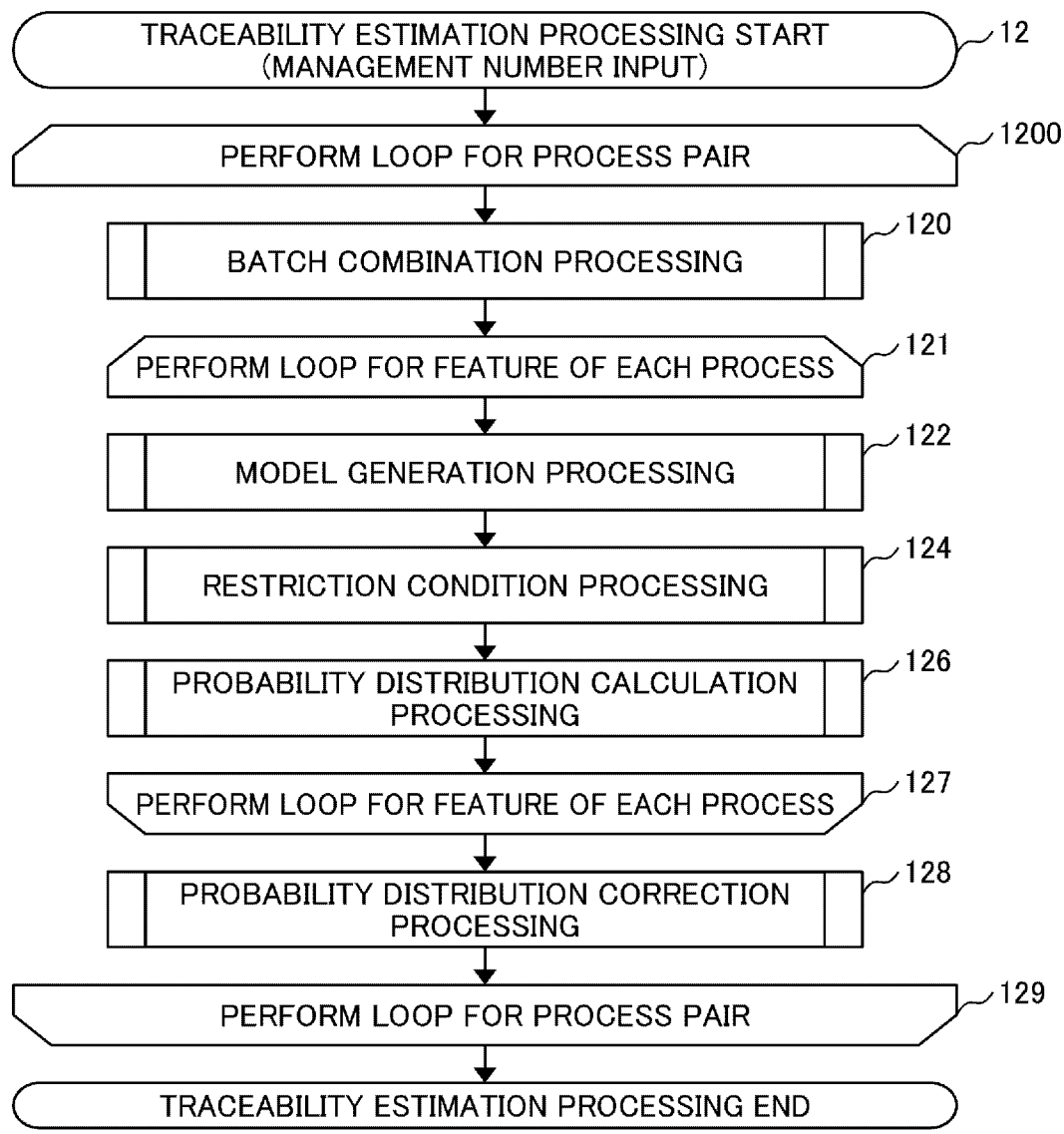

FIG. 19

BATCH COMBINATION OUTPUT DATA

| MANAGEMENT NUMBER | PROCESS NUMBER_ UPSTREAM | BATCH NUMBER_ UPSTREAM | FEATURE_ UPSTREAM 1 | FEATURE_ UPSTREAM 2 | ... | PROCESS NUMBER_ DOWNSTREAM | BATCH NUMBER_ DOWNSTREAM | FEATURE_ DOWNSTREAM 1 | FEATURE_ DOWNSTREAM 2 |
|---|---|---|---|---|---|---|---|---|---|
| P | 1 | A | 23.3 | 102.1 | ... | 2 | X | 17.2 | 4.3 |
| P | 1 | A | 23.3 | 102.1 | ... | 2 | Y | 15.6 | 14.8 |
| P | 1 | B | 14.4 | 88.2 | ... | 2 | X | 17.2 | 4.3 |
| P | 1 | B | 14.4 | 88.2 | ... | 2 | Y | 15.6 | 14.8 |
| Q | 1 | C | 19.8 | 69.7 | ... | 2 | Z | 19.0 | 60.1 |
| Q | 1 | C | 19.8 | 69.7 | ... | 2 | W | 18.4 | 35.2 |
| ... | ... | ... | ... | ... | ... | ... | ... | ... | ... |

F I G. 2 0
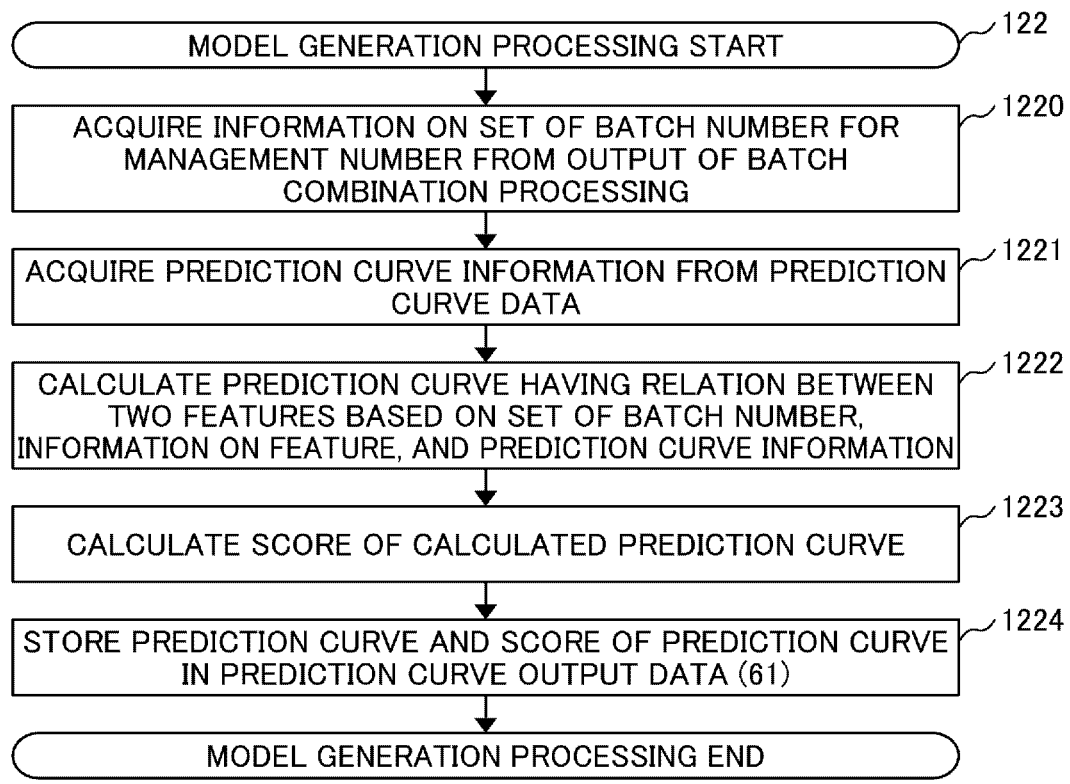

F I G. 2 1

PREDICTION CURVE OUTPUT DATA

| PROCESS NUMBER _UPSTREAM | FEATURE _UPSTREAM | PROCESS NUMBER _DOWNSTREAM | FEATURE _DOWNSTREAM | PREDICTION CURVE SHAPE | PREDICTION CURVE PARAMETER | SCORE |
|---|---|---|---|---|---|---|
| 1 | CURRENT | 2 | TEMPERATURE | EXPONENTIAL FUNCTION | y=0.03*1.1^x | 0.5 |
| 1 | CURRENT | 2 | PRESSURE | LINEAR | y=3.5x + 2.7 | 0.1 |
| 2 | OPERATION TIME | 4 | PRESSURE | – | y=–1.5x + 32.7 | 0.7 |
| ... | ... | ... | ... | ... | ... | ... |

61

F I G. 2 2
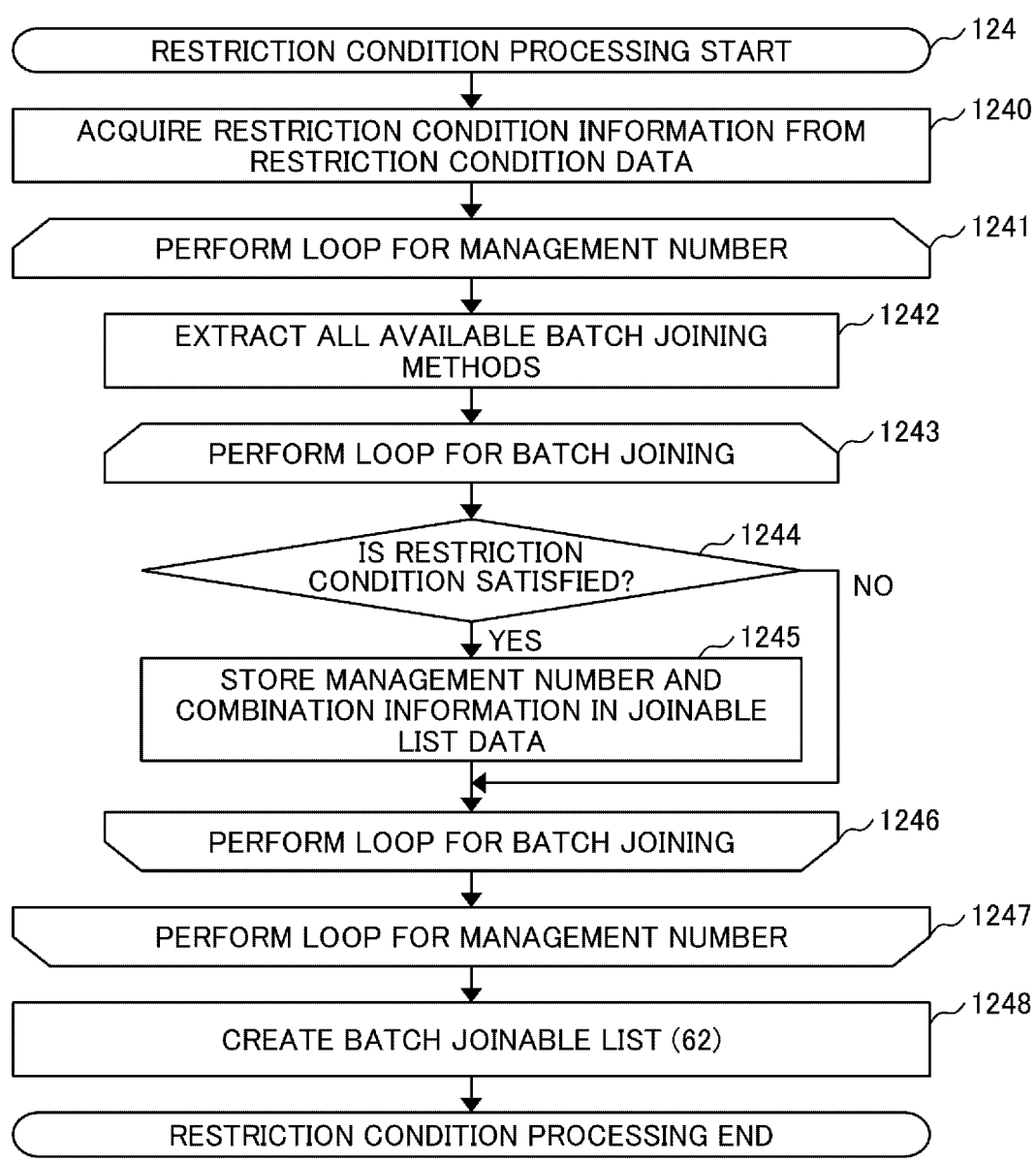

F I G. 2 4

BATCH JOINABLE LIST (MANAGEMENT NUMBER P) 62

| (A, X) | (A, Y) | (B, X) | (B, Y) |
|---|---|---|---|
| 1 | 1 | 1 | 1 |
| 1 | 1 | 1 | 0 |
| 1 | 1 | 0 | 1 |
| 0 | 0 | 1 | 1 |
| 1 | 1 | 0 | 1 |
| 1 | 0 | 1 | 0 |
| 1 | 0 | 1 | 0 |

F I G. 2 6

EACH-FEATURE TRACEABILITY PROBABILITY DISTRIBUTION OUTPUT DATA (MANAGEMENT NUMBER P) 63

| PROCESS | FEATURE | PROCESS | FEATURE | (A, X) | (A, Y) | (B, X) | (B, Y) | PROBABILITY |
|---|---|---|---|---|---|---|---|---|
| 1 | CURRENT | 2 | TEMPERATURE | 1 | 1 | 1 | 1 | 0.15 |
| 1 | CURRENT | 2 | TEMPERATURE | 1 | 1 | 1 | 0 | 0.11 |
| 1 | CURRENT | 2 | TEMPERATURE | 1 | 1 | 0 | 1 | 0.55 |
| 1 | CURRENT | 2 | TEMPERATURE | 1 | 0 | 1 | 1 | 0.06 |
| 1 | CURRENT | 2 | TEMPERATURE | 0 | 1 | 1 | 1 | 0.05 |
| 1 | CURRENT | 2 | TEMPERATURE | 1 | 1 | 0 | 0 | 0.07 |
| 1 | CURRENT | 2 | TEMPERATURE | 1 | 0 | 1 | 0 | 0.01 |
| 1 | CURRENT | 2 | PRESSURE | 1 | 1 | 1 | 1 | 0.01 |
| 1 | CURRENT | 2 | PRESSURE | 1 | 1 | 1 | 0 | 0.20 |
| 1 | CURRENT | 2 | PRESSURE | 1 | 1 | 0 | 1 | 0.07 |
| 1 | CURRENT | 2 | PRESSURE | 1 | 0 | 1 | 1 | 0.06 |
| 1 | CURRENT | 2 | PRESSURE | 0 | 1 | 1 | 1 | 0.44 |
| 1 | CURRENT | 2 | PRESSURE | 1 | 1 | 0 | 0 | 0.03 |
| 1 | CURRENT | 2 | PRESSURE | 1 | 0 | 1 | 0 | 0.19 |
| ⋮ | ⋮ | ⋮ | ⋮ | ⋮ | ⋮ | ⋮ | ⋮ | ⋮ |

F I G. 2 8
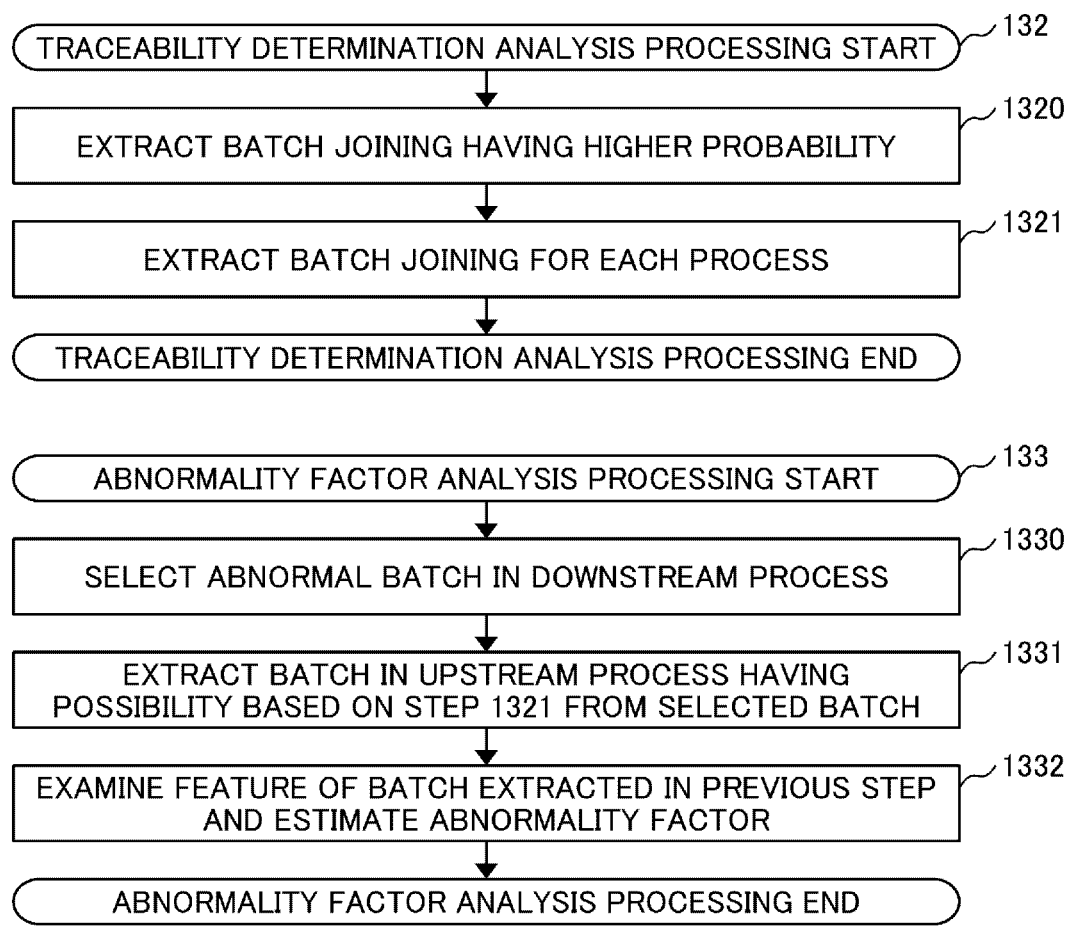

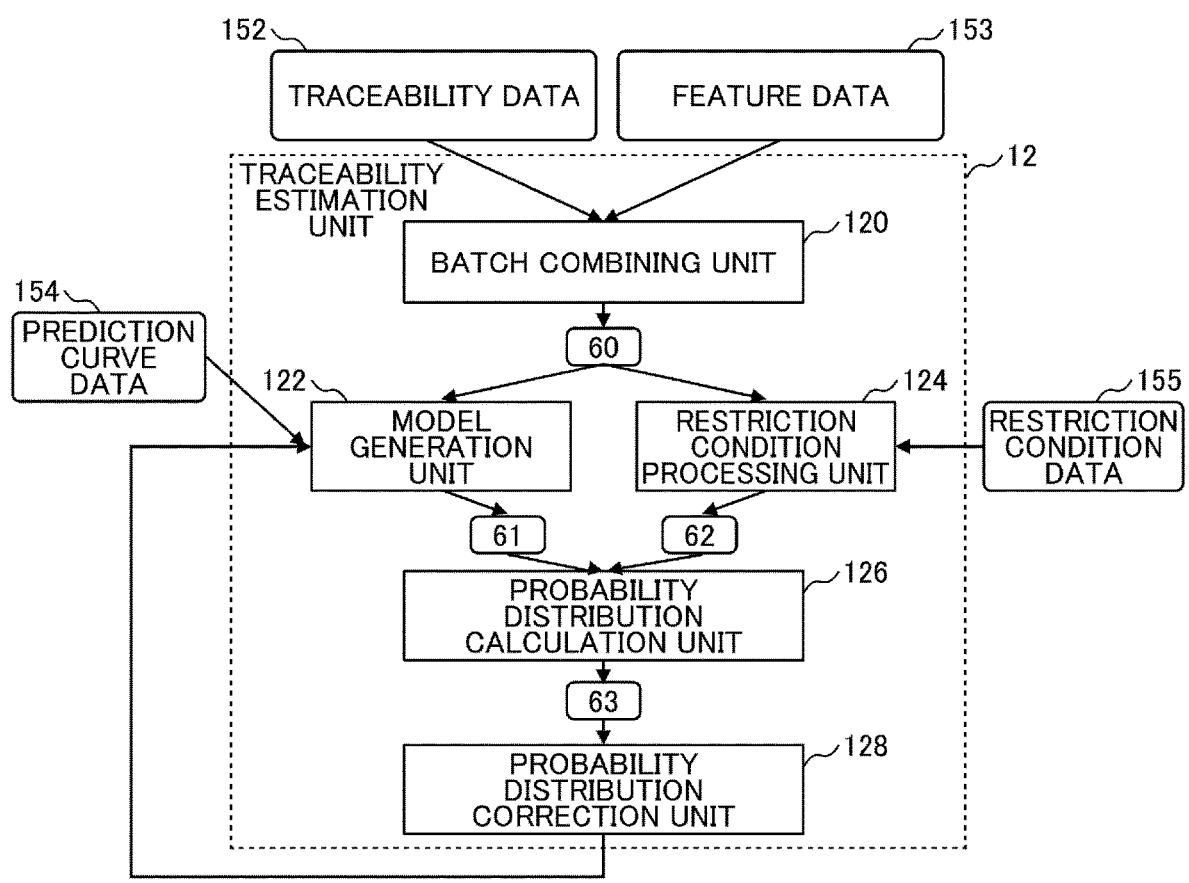
F I G. 3 3

ANALYSIS SYSTEM

CROSS-REFERENCE TO RELATED APPLICATION

The present application claims priority from Japanese application JP 2019-226541, filed on Dec. 16, 2019, the contents of which is hereby incorporated by reference into this application.

BACKGROUND OF THE INVENTION

1. Field of the Invention

The present invention relates to an analysis system.

2. Description of the Related Art

On a production line, there is a high demand for performing a defect factor analysis and quality analysis. In order to perform such an analysis, it is necessary to compare the features for each work between different processes to each other and to examine the relation between the features. In order to perform this examination, it is necessary to set accurate traceability. The traceability indicates how work units in a process are associated.

A work unit in a process is referred to as "a batch". If individual management of each batch in each process is possible, and an ID is assigned to the batch, it is possible to realize the accurate traceability. When individual management is not possible, and an ID is collectively assigned to a plurality of batches, realization of traceability for batch correspondence has a problem.

An ID that is collectively assigned to a plurality of batches is referred to as "a management number". As a technology of examining detailed traceability when individual management of a product is not possible because the product is powdery, granular, or liquid, there is a technology disclosed in JP 2012-103848 A.

JP 2012-103848 A discloses a method of estimating traceability information with raw materials used in the subsequent process, by performing comparison of the arrival time of the raw materials and the received amount of the raw materials in the previous process. In JP 2012-103848 A, it is disclosed that "there is provided a traceability management system capable of recognizing movement of raw materials in the same manner regardless of the form of the raw material".

In JP 2012-103848 A, a method of estimating the traceability in a case where, when a product is transferred to the subsequent process, a manufacturing sequence between processes is not ensured, for example, a case where the batch order is changed or a case where batch correspondence is many-to-many is not considered.

SUMMARY OF THE INVENTION

An object of the present invention is to estimate the traceability even though individual management of a product is not performed, and a manufacturing sequence between processes is not ensured.

According to an aspect of the present invention, an analysis system includes a traceability estimation unit that estimates traceability. In traceability data configured by a relation between batches tied by a management number, a process, the batch in each process, and a feature of the batch are associated with each other. The process includes a first process and a second process. The traceability estimation unit generates batch combination output data configured by a plurality of combinations of a batch in the first process and a batch in the second process, and the feature of the batch, and estimates the combination of the batch in the first process and the batch in the second process, which is used as traceability, from the plurality of the combinations of the batches in the batch combination output data by using the feature.

According to another aspect of the present invention, an analysis system includes a traceability estimation unit that estimates traceability, and an analysis unit that performs an analysis. In traceability data configured by a relation between batches tied by a management number, a process, the batch in each process, and a feature of the batch are associated with each other. The traceability estimation unit estimates the traceability being a combination of batches in different processes, by using a feature of the batch. The analysis unit performs a factor analysis with a relation between the batches in the different processes in the estimated traceability, and the feature of each batch.

According to the aspect of the present invention, it is possible to estimate the traceability even though individual management of a product is not performed, and a manufacturing sequence between processes is not ensured.

BRIEF DESCRIPTION OF THE DRAWINGS

FIG. 5 is a table configuration diagram showing production management information data 150;

FIG. 6 is a table configuration diagram showing sensor data 151;

FIG. 7 is a table configuration diagram showing traceability data 152;

FIG. 8 is a table configuration diagram showing feature data 153;

FIG. 9 is a table configuration diagram showing prediction curve data 154;

FIG. 10 is a table configuration diagram showing restriction condition data 155;

FIG. 11 is a table configuration diagram showing traceability probability distribution data 156;

FIG. 12 is a table configuration diagram showing a feature library 157;

FIG. 15 is a flowchart illustrating each-batch feature calculation processing 112 in the feature calculation unit 11;

FIG. 16 is a flowchart of a traceability estimation unit 12;

FIG. 19 is a table configuration diagram showing data output by the batch combination processing 120;

FIG. 20 is a flowchart illustrating model generation processing 122 in the traceability estimation unit 12;

FIG. 21 is a table configuration diagram showing prediction curve output data output by the model generation processing 122;

FIG. 22 is a flowchart illustrating restriction condition processing 124 in the traceability estimation unit 12;

FIG. 24 is a table configuration diagram showing a joinable list output by the restriction condition processing 124;

FIG. 26 is a table diagram showing each-feature traceability probability distribution output data output by the probability distribution calculation processing;

FIG. 28 is a flowchart illustrating traceability determination analysis processing 132 in an analysis unit 13 according to Embodiment 2;

FIG. 33 is a functional block diagram illustrating a traceability estimation system according to Embodiment 4;

DETAILED DESCRIPTION OF THE PREFERRED EMBODIMENTS

Hereinafter, embodiments will be described with reference to the drawings.

Embodiment 1

Figure 1:
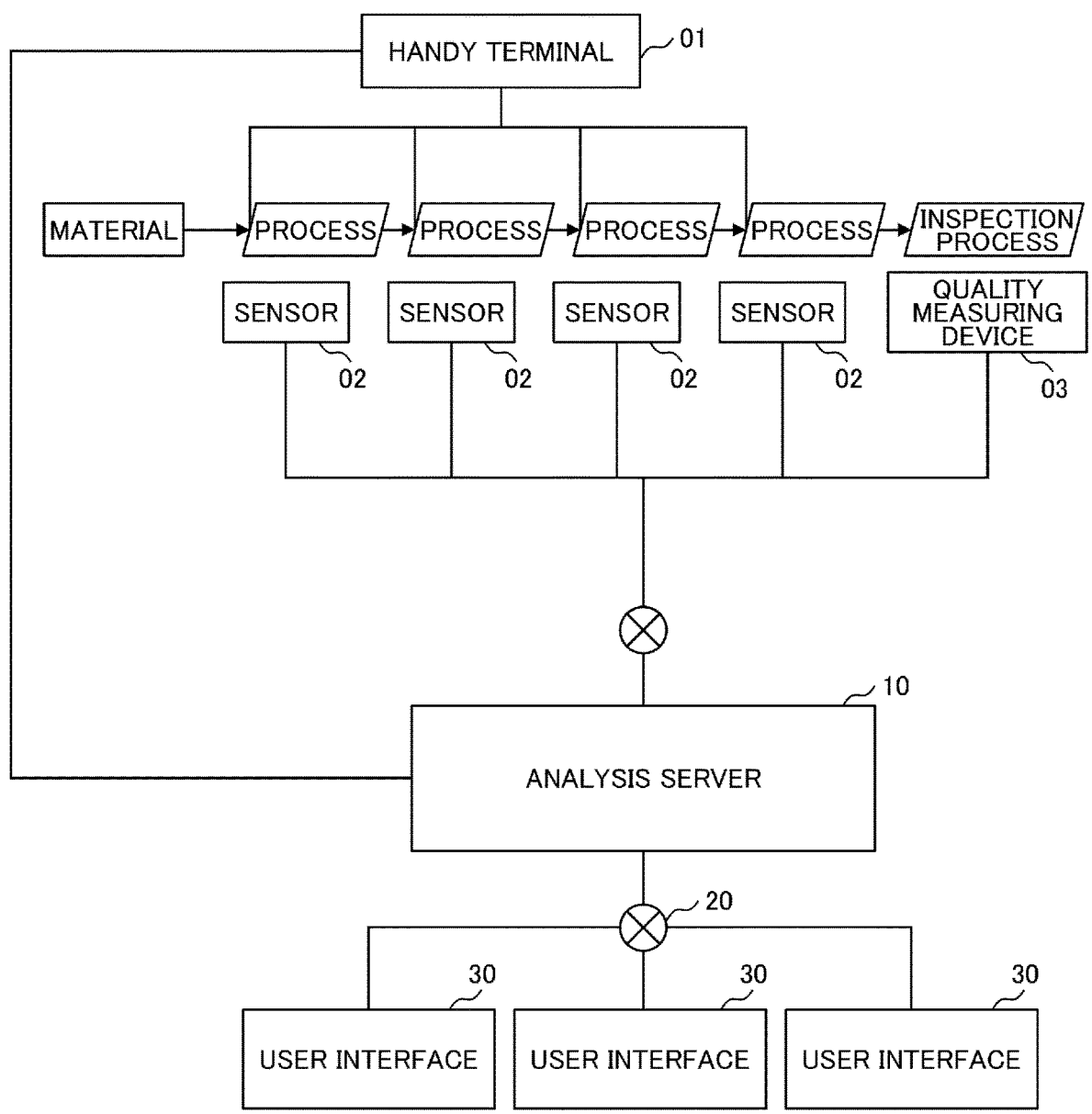
FIG. 1 is a system configuration diagram illustrating a traceability estimation system.

A system configuration of a traceability estimation system will be described with reference to FIG. 1.

The traceability estimation system includes a handy terminal 01, a sensor 02, a quality measuring device 03, an analysis server 10, and a user interface 30, and these components are connected to each other via a wired or wireless network. Data acquired by the handy terminal 01 and the sensor 02 in a process is transmitted to the analysis server 10, and an analysis result is transmitted to the user interface 30.

Figure 2:
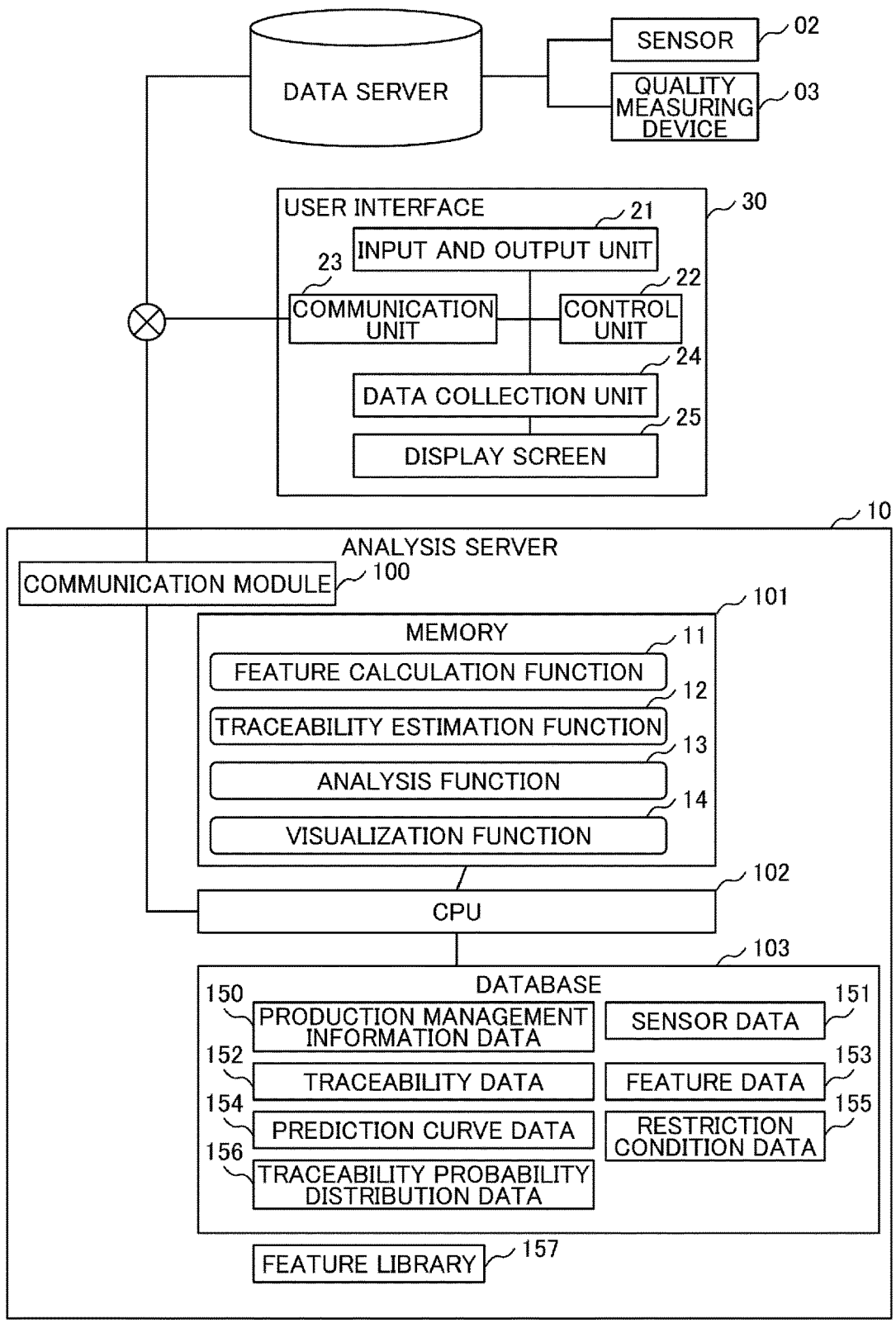
FIG. 2 is a hardware configuration diagram illustrating the traceability estimation system.

FIG. 2 is a hardware configuration diagram illustrating the traceability estimation system.

The traceability estimation system includes a communication module 100 that performs communication of information collected in the analysis server 10, a CPU 102 that performs various calculations, a memory 101, and a database 103. The memory 101 has various calculation functions. Data as a reference and data to be output are stored in the database 103.

The memory 101 includes a feature calculation function 11 of calculating a feature required for traceability estimation, a traceability estimation function 12 of outputting traceability probability distribution data 156 based on the feature, an analysis function 13 of performing various types of analysis based on the traceability probability distribution data 156, and a visualization function 14 of displaying an analysis result on a display screen 25 in the user interface 30. The database 103 includes production management information data 150, sensor data 151, traceability data 152, feature data 153, prediction curve data 154, restriction condition data 155, the traceability probability distribution data 156, and a feature library 157. The user interface 30 includes an input and output unit 21, a control unit 22, a communication unit 23, a data collection unit 24, and the display screen 25.

Figure 3:
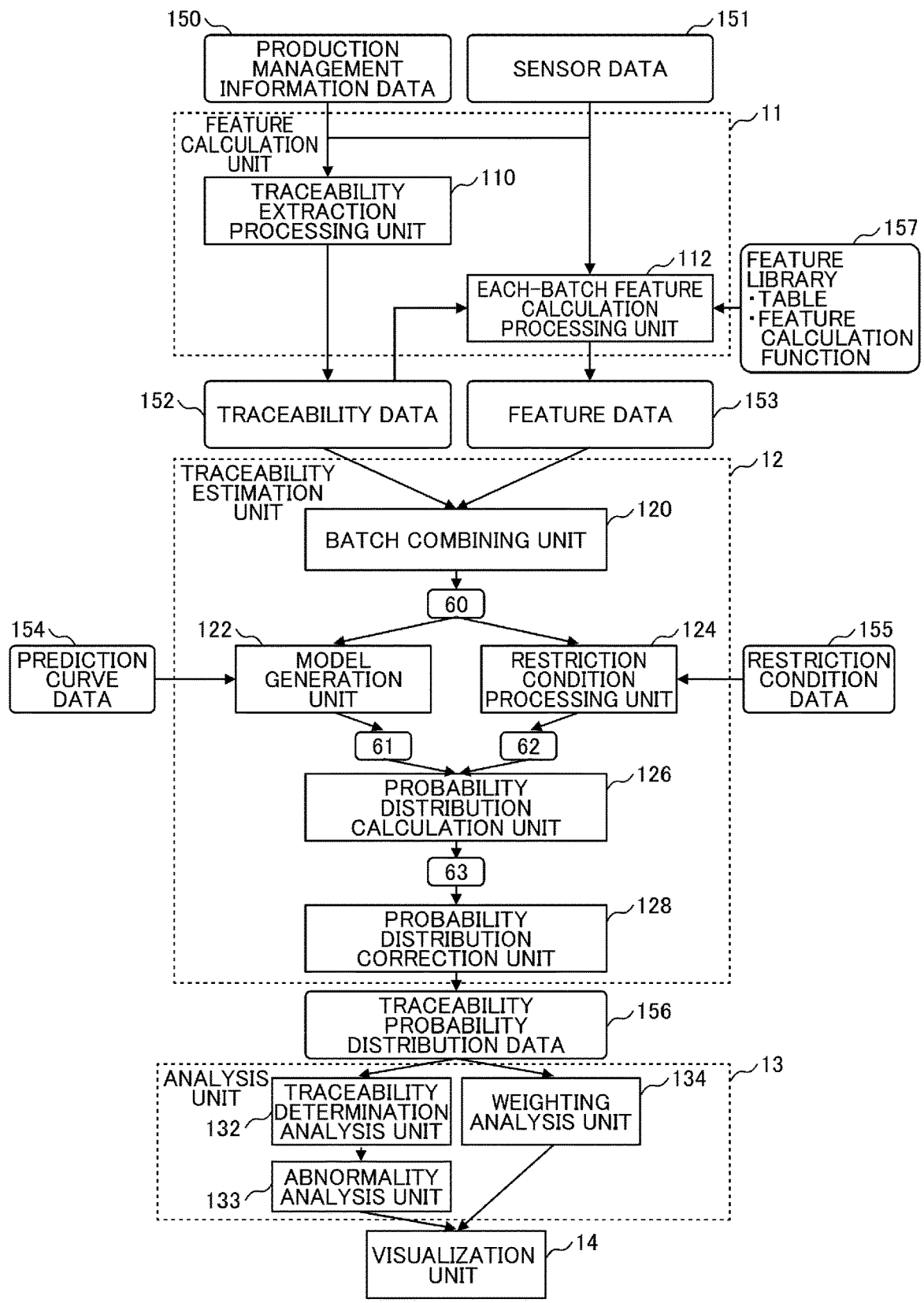
FIG. 3 is a functional block diagram illustrating a traceability estimation system according to Embodiment 1.

FIG. 3 is a block diagram illustrating the function of the traceability estimation system in Embodiment 1.

The feature calculation unit 11 generates traceability data 152 configured by a relation between batches tied by a management number and feature data 153 configured by a feature of each batch. The feature calculation unit uses, as an input, production management information data 150 measured just before each process, sensor data 151 acquired from a sensor installed in each process, and a feature library 157 configured by a feature calculation method and a function for performing a calculation in practice.

The feature calculation unit 11 includes a traceability extraction processing unit 110 and an each-batch feature calculation processing unit 112. The traceability extraction processing unit 110 generates traceability data 152 by using production management information data 150 as an input.

The each-batch feature calculation processing unit 112 generates feature data 153 by using the sensor data 151, the production management information data 150, and the feature library 157 as an input. The traceability estimation unit 12 generates traceability probability distribution data 156 configured by information on a probability of batch joining. The traceability estimation unit uses, as an input, the traceability data 152, the feature data 153, prediction curve data 154, and restriction condition data 155. The prediction curve data 154 is configured by information on a model expression of a feature in a different process, which is input by human knowledge. The restriction condition data 155 is configured by information on a restriction condition in a batch joining method, which is input by human knowledge.

The traceability estimation unit 12 includes a batch combining unit 120, a model generation unit 122, a restriction condition processing unit 124, a probability distribution calculation unit 126, and a probability distribution correction unit 128. The batch combining unit 120 generates batch combination output data 60 by using the traceability data 152 and the feature data 153 as an input.

The model generation unit 122 generates prediction curve output data 61 by using batch combination output data 60 and the prediction curve data 154 as an input. The restriction condition processing unit 124 generates a batch joinable list 62 by using the batch combination output data 60 and the restriction condition data 155 as an input.

The probability distribution calculation unit 126 generates each-feature traceability probability distribution output data 63 by using prediction curve output data 61 and batch joinable list 62. The probability distribution correction unit 128 generates traceability probability distribution data 156 by using each-feature traceability probability distribution output data 63 as an input.

The analysis unit 13 performs an analysis in accordance with the purpose, by using the traceability probability distribution data 156 as an input. A traceability determination analysis unit 132 performs regression analysis, correlation analysis, or abnormality factor analysis after determining the correspondence of works between processes. A weighting analysis unit 134 performs the regression analysis, the correlation analysis, or the abnormality factor analysis while giving a weight depending on a probability. Analysis results are displayed in a visualization unit 14.

Figure 4:
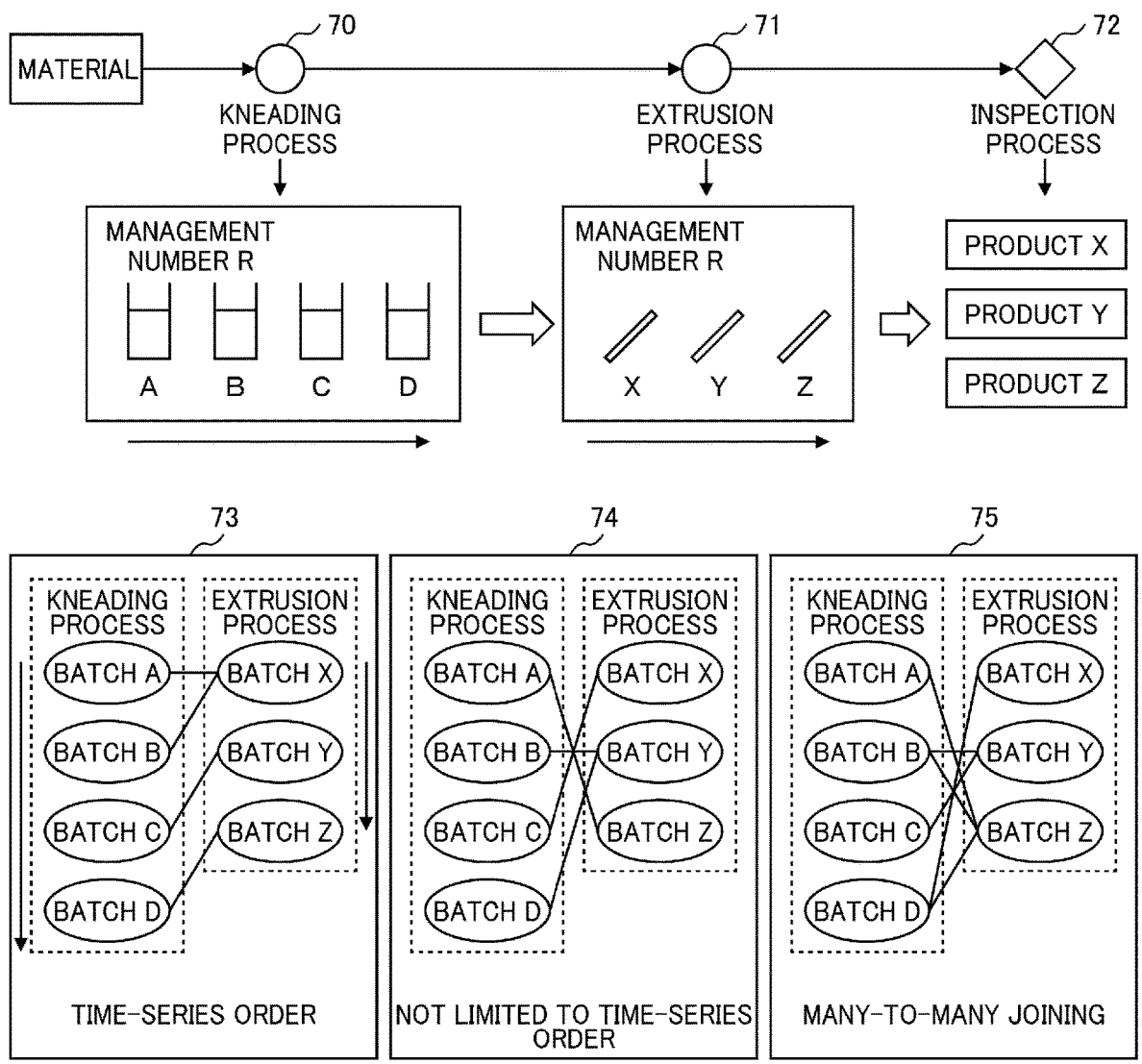
FIG. 4 is a diagram describing the background of the present invention.

FIG. 4 is a diagram describing the background of the present invention.

FIG. 4 illustrates an example in which a form of manufacturing an electric wire is simplified. In production of an electric wire, after a kneading process of kneading raw materials, an extrusion process of performing extrusion to a core wire with the finished rubber material as a coating of the electric wire, by applying pressure is performed. Last, an inspection process of inspecting quality of the electric wire, such as elongation and tensile strength of the finished electric wire is performed. The number assigned to each of the processes is defined as "a process number". In Embodiment 1, it is assumed that a number being Process 1 is assigned to the kneading process, and a number being Process 2 is assigned to the extrusion process.

Firstly, one management number R is assigned to four batches A, B, C, and D in Process 1. The reason of division into the four batches in Process 1 as in Embodiment 1 is that the capacity allowed to be kneaded at one time is fixed, and a work in the process is divided. Batches under the management number R are collectively processed in Process 2. Process 2 is configured by three batches X, Y, and Z, and products in the batches are respectively finished. The reason of division into the three batches in Process 2 is that the length of an electric wire completed as a product is fixed.

At this time, it is unclear which batch X, Y, or Z in Process 2 corresponds to which batch in Process 1. Thus, inconvenience arises in abnormality factor analysis or quality analysis. In addition, in JP 2012-103848 A, it is possible to handle a case (as indicated by the reference sign of 73) of performing the next process while maintaining the time-series order of each process. However, there is a problem that it is not possible to handle a case (as indicated by the reference sign of 74) of not ensuring the time-series order or a case (as indicated by the reference sign of 75) of many-to-many joining occurring. Thus, the object of the present invention is to solve the above problem.

This problem arises from a point that in manufacturing, only management at a management number level is performed from the viewpoint of cost and the difficulty of sensor installation, and it is not possible to recognize the batch sequence under the management number.

FIGS. 5 to 12 show tables of various types of data in the database 103.

FIG. 5 shows a table of the production management information data 150. This table is configured by a process number, a management number, a number of a batch being a work unit, and information of the batch at a production time point of a work start time and a work end time. The information of the batch at the production time point may include, for example, other columns such as a production amount.

FIG. 6 shows a table of the sensor data 151. This table is configured by sensor data acquired in each process. In FIG. 6, the sensor data is acquired every one second.

FIG. 7 shows a table of the traceability data 152. This table is configured by the management number, the process number, and a batch number. In this table, batch numbers of processes associated with each management number are arranged. For example, when only a management number P is viewed, it is understood that a batch A and a batch B correspond to a process number 1, and a batch X and a batch Y correspond to a process number 2.

FIG. 8 shows a table of the feature data 153. This table is configured by the process number, the management number, the batch number, the work start time, the work end time, and the feature of each piece of sensor data.

FIG. 9 shows a table of the prediction curve data 154. In this table, two processes to be compared to each other and a relation of the feature between the two processes are described. For example, in the first row, it is described that the feature of a current in the process number 1 has an exponential relation with the feature of a temperature in the process number 2.

FIG. 10 shows a table of the restriction condition data 155. In this table, restriction conditions corresponding to two processes to be compared to each other are described. For example, a restriction condition that the batch of the process number 1 and the batch of the process number 2 have many-to-one correspondence is described in the first row.

FIG. 11 shows a table of the traceability probability distribution data 156. This table is provided for each of the numbers of two processes to be compared to each other and each management number. In FIG. 11, traceability probability distribution data corresponding to the process number 1, the process number 2, and the management number P is shown. For example, in the third row, 1, 1, 0, 1, and 0.01 are described in order from the left, and this means that a probability that batch pairs of (A, X), (A, Y), and (B, Y) are tied and a batch pair of (B, X) is not tied is 0.01.

FIG. 12 shows a table of the feature library 157. In this library, a required feature and a calculation method of the required feature in a feature calculation function 11 are described.

Figure 13:
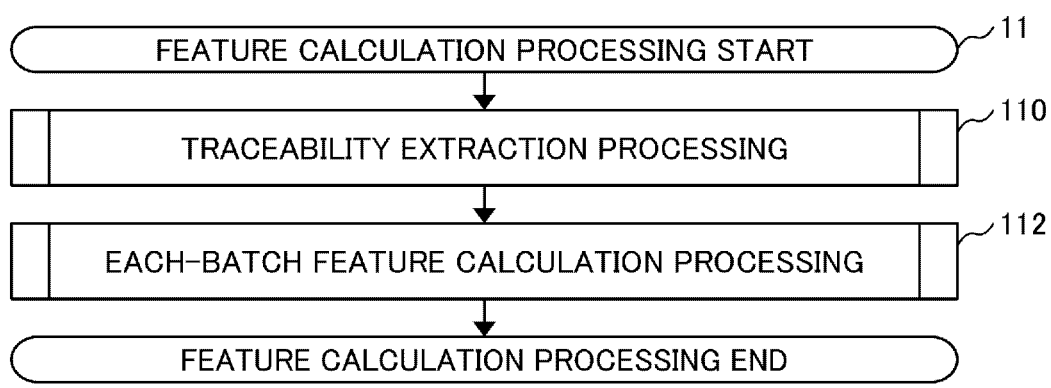
FIG. 13 is a flowchart of a feature calculation unit 11.
Figure 14:
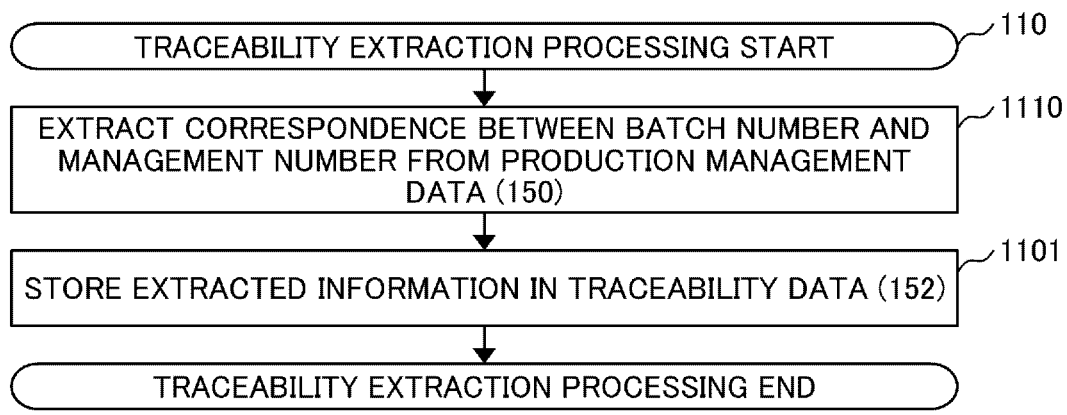
FIG. 14 is a flowchart illustrating traceability extraction processing 110 in the feature calculation unit 11.

Flowcharts of various functions of the traceability estimation system in Embodiment 1 will be described. The traceability estimation system in Embodiment 1 operates based on various flowcharts in FIGS. 13 to 29. The general operation is as in the functional block diagram illustrated in FIG. 4, and the details of each functional block will be described below. Firstly, the feature calculation unit 11 generates the feature required for estimating traceability. FIGS. 13 to 15 correspond to such processing.

FIG. 13 is a flowchart when the feature calculation unit 11 calculates the feature. The operation based on the flowchart is as follows.

In Step 110, a process number and a batch number tied by a management number are extracted. This step is configured by the flowchart illustrated in FIG. 14.

In Step 112, the feature of each batch is calculated. This step is configured by the flowchart illustrated in FIG. 15.

FIG. 14 is a flowchart in which the traceability extraction processing unit 110 extracts traceability data from the production management information data 150. The operation based on the flowchart is as follows.

In Step 1100, a process number and a batch number of each management number are extracted from the production management information data 150.

In Step 1101, data extracted in Step 1100 is stored in the traceability data 152.

FIG. 15 is a flowchart in which the each-batch feature calculation processing unit 112 calculates the feature of each batch in each process. The operation based on the flowchart is as follows.

In Step 1120, loop processing for the process number, the management number, and the batch number is performed.

In Step 1121, production time information relating to the corresponding process number and batch number is extracted from the production management information data 150.

In Step 1122, a sensor value within a range from a work start time to a work end time, which are extracted in Step 1121, is extracted from the sensor data 151. At this time, the sensor value within such a range is extracted based on the column of "time" in a sensor data table.

In Step 1123, a part of "a calculation method" is extracted from a column corresponding to "a sensor name" in the table of the feature library 157.

In Step 1124, the feature is calculated based on the sensor value extracted in Step 1122, by the calculation method extracted in Step 1123. For example, according to the first row in the table of the feature library 157, the frequency of the current in Process 1 is to be taken in as the feature. Thus, the frequency of the current is calculated. When such a calculation is performed, the calculation is performed based on a function stored in the feature library 157.

In Step 1125, the feature calculated in Step 1123, the corresponding process number, and the corresponding batch number are stored in the feature data 153.

In Step 1126, the loop processing for the process number and the batch number is ended. With the above description, calculation of the required feature is completed.

Then, the traceability is estimated using the calculated feature. FIGS. 16 to 27 correspond to such processing.

FIG. 16 is a flowchart illustrates processes in the traceability estimation unit 12. The operation based on the flowchart is as follows.

In Step 1200, loop processing for a process pair is performed. The process pair is not assumed to be adjacent. The processes in the process pair are referred to an upstream process and a downstream process, respectively.

In Step 120, a process of enumerating a combination of batches in different processes is performed. This step is configured by the flowchart illustrated in FIG. 18. In Step 121, loop processing is performed for each set of features of the processes.

In Step 122, a prediction curve is calculated based on the combination of the batches output in Step 120, the set of the features of the batches, and the prediction curve data 154. This step is configured by the flowchart illustrated in FIG. 20.

In Step 124, restriction condition processing for the combination of the batches is performed. This step is configured by the flowchart illustrated in FIG. 22.

In Step 126, a process of calculating probability distribution is performed. This step is configured by the flowchart illustrated in FIG. 25.

In Step 127, the loop processing for the process feature is ended.

In Step 128, the probability distribution 129 for each set of the features, which has been calculated in Step 126, is integrated. This step is configured by the flowchart illustrated in FIG. 27.

Figure 17:
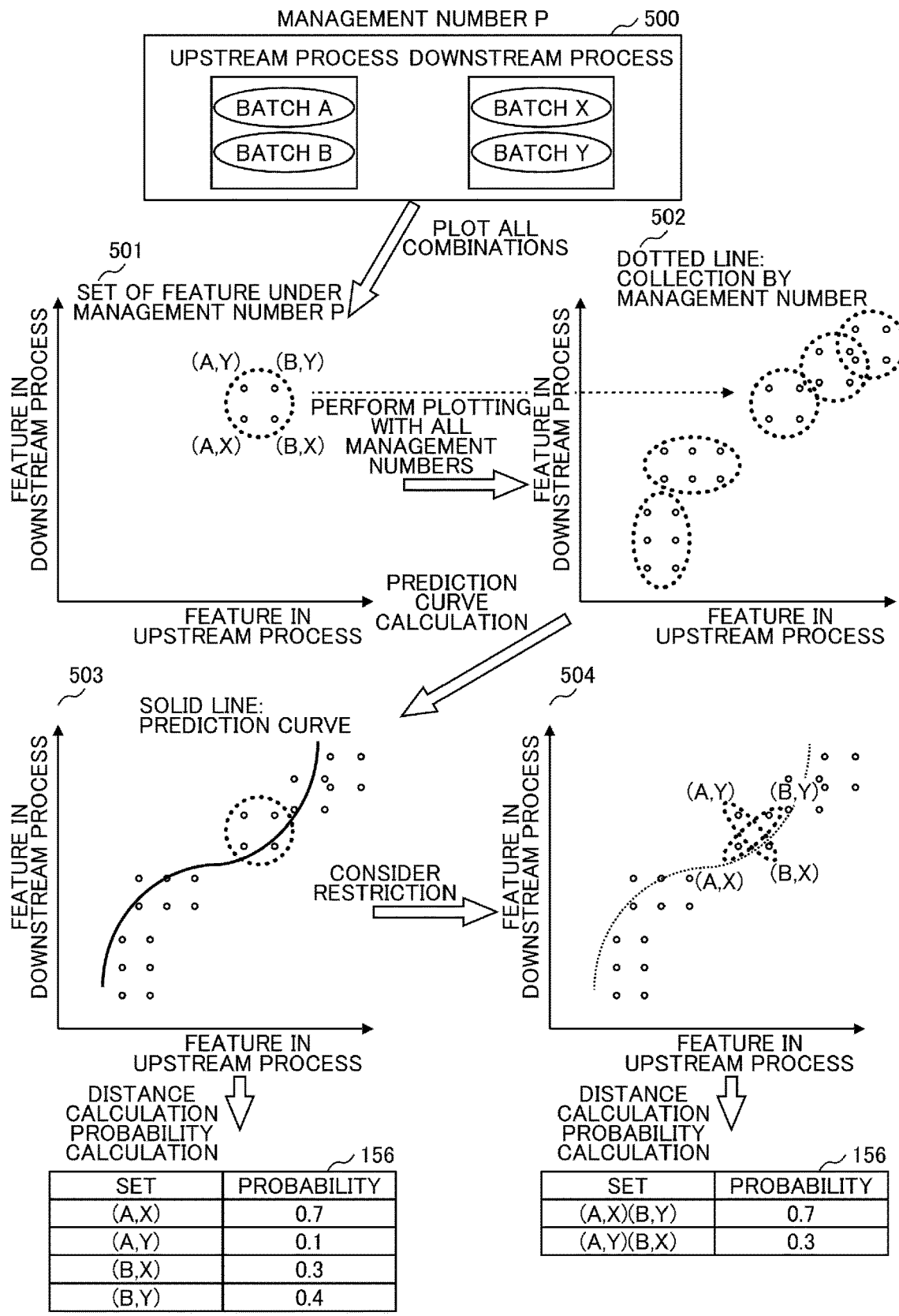
FIG. 17 is a conceptual diagram describing a method of traceability estimation.

FIG. 17 illustrates an outline of a method in the traceability estimation unit 12. The outline will be described below.

Firstly, a set 500 of a batch for each process in a management number unit is set as an input. As with the reference sign of 501, all batch combinations under the management number are extracted, and a set of features corresponding to the batch combination is plotted. As with the reference sign of 502, an operation indicated by the reference sign of 501 is performed for all management numbers. As with the reference sign of 503, a prediction curve that fits the plotted points is calculated.

When there is no restriction condition for the batch combination, the probability distribution is output based on a distance from the prediction curve calculated with the reference sign of 503. When a restriction condition for the batch combination is provided, as with the reference sign of 504, the candidates are narrowed down considering the restriction condition for the batch combination. For example, in the graph indicated by the reference sign of 504, two combinations surrounded by dotted circles are obtained by narrowing down.

Last, the probability distribution of a set for joining is calculated based on the distance from the prediction curve calculated with the reference sign of 503.

Figure 18:
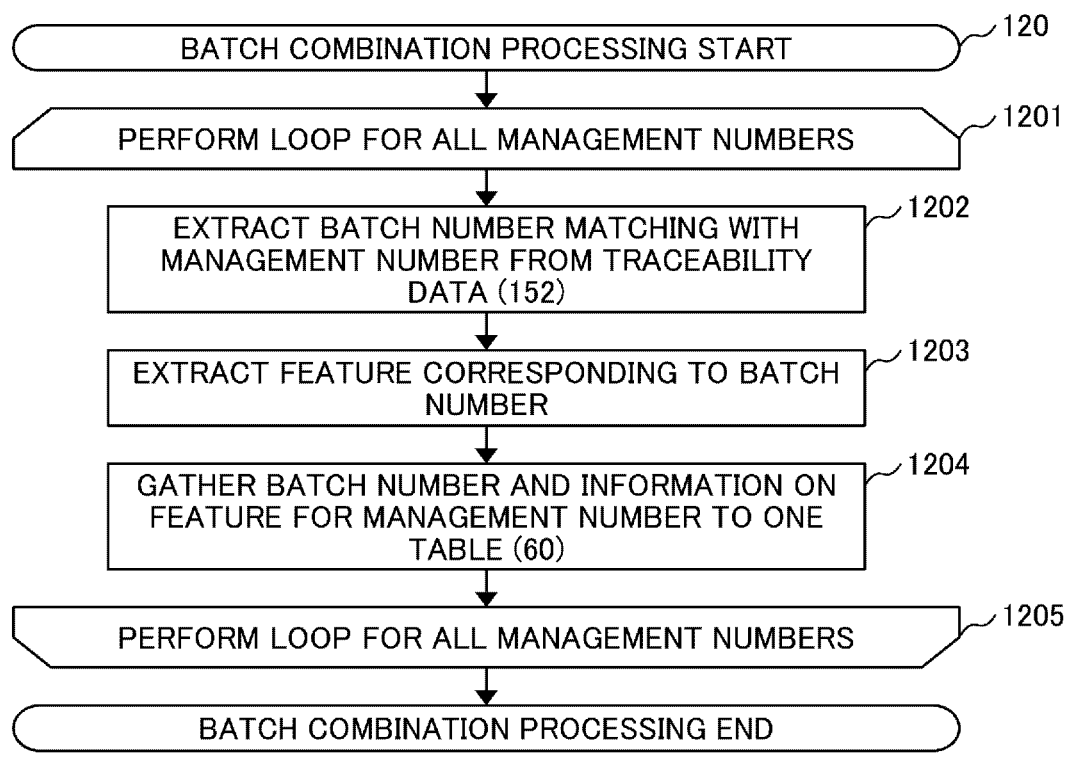
FIG. 18 is a flowchart illustrating batch combination processing 120 in the traceability estimation unit 12.

FIG. 18 is a flowchart illustrating processes in the batch combination processing 120. The operation based on the flowchart is as follows.

In Step 1201, loop processing for a management number is performed.

In Step 1202, all rows including each management number and two process names designated in Step 1200 are extracted from the traceability data 152. Then, a combination of the batch number in the row is extracted. For example, when n batches are provided in one process, and m batches are provided in the other process, all batch combinations for the above batches are output, and thus n*m batch combination data is obtained.

In Step 1203, the feature tied by the batch number is extracted from the feature data 153.

In Step 1204, the batch combination data extracted in Step 1202 and the feature of each batch, which has been extracted in Step 1203, are output to the batch combination output data 60. Thus, the data in which the feature in the process is stored is obtained for each batch pair.

In Step 1205, the loop processing for the management number is ended.

FIG. 19 shows the table of the batch combination output data. The batch combination in the upstream process and the downstream process designated in Step 1200 and the feature of each batch for one management number are described in a column.

FIG. 20 is a flowchart in which a parameter of the prediction curve is output to the prediction curve output data 61 based on the output of the batch combination processing 120 and prediction curve information. The operation based on the flowchart is as follows.

In Step 1220, the batch combination under one management number and a set of a numerical value of the feature, which is based on the set of the feature designated in Step 121, is extracted based on the batch combination output data 60, in the batch combination processing 120.

In Step 1221, shape information of the prediction curve is extracted from a column of "a prediction curve shape" in the prediction curve data 154. Five types of patterns being a linear function, a quadratic or higher polynomial, an exponential function, a logarithmic function, and a trigonometric function and a blank pattern are described in this column. In the case of the blank pattern, the shape is considered as being linear.

In Step 1222, the set of the numerical value of the feature corresponding to the set of the batch extracted in Step 1220 is extracted. Then, the expression for the prediction curve is calculated using the information of "the prediction curve shape" extracted in Step 1221. When the prediction curve is calculated, parameters of the regression equation are determined using the least squares method. For example, if the function described in "the prediction curve shape" is "linear", a and b in y=a*x+b being a linear regression equation are determined.

In Step 1223, the score of the calculated prediction curve is calculated. For example, the determination coefficient of the regression equation is used.

In Step 1224, the feature designated in Step 121, the expression of the prediction curve calculated in Step 1222, and the score of the prediction curve, which has been calculated in Step 1223, are stored in prediction curve output data 61.

FIG. 21 is a table diagram showing the prediction curve output data. The process pair, the prediction curve parameter calculated for the feature, and the score of the prediction curve are described. For example, in the first line, a prediction curve for a feature of a current in Process 1 and a feature of a temperature in Process 2 may be described in a form of y=0.03*1.1^x, and the score of the prediction curve is described to be 0.5.

FIG. 22 is a flowchart of processing the restriction condition for batch joining. A batch joinable list 62 for each management number is output. The operation based on the flowchart is as follows.

In Step 1240, information described in the column of "restriction condition" corresponding to the pair of the process number is extracted from the restriction condition data 155. Patterns of "many-to-one", "one-to-many", "one-to-zero none", "production amount", "only forward or reverse order", and "many-to-many none" are described in the "restriction condition" column. Details of the description will be described below.

"Many-to-one" indicates a restriction condition that a plurality of batches in the upstream process correspond to one batch in the downstream process. "One-to-many" indicates a restriction condition that a plurality of batches in the downstream process correspond to one batch in the upstream process. "One-to-zero none" indicates a restriction condition that every batch is necessarily combined with another batch.

"Production amount" indicates a restriction condition on a batch joining ratio, which is determined based on the production amount of each batch.

"Only forward or reverse order" indicates a restriction condition that only two types are considered, that is, the process number correspond to the time series order or a reverse order of the time series in the management number. For example, regarding a linear product such as an electric wire, this condition occurs when the direction of the wire is maintained as it is or is reversed after the wire is cut in the process. "Many-to-many none" indicates a restriction condition that many-to-many joining of batches is not allowed. When this column is blank, processing is performed without setting the restriction condition.

In Step 1241, loop processing for the management number is performed. In Step 1242, data of the batch corresponding to the management number is extracted from the batch combination output data 60, and a batch joining method list is created by enumerating all joining methods.

Figure 23:
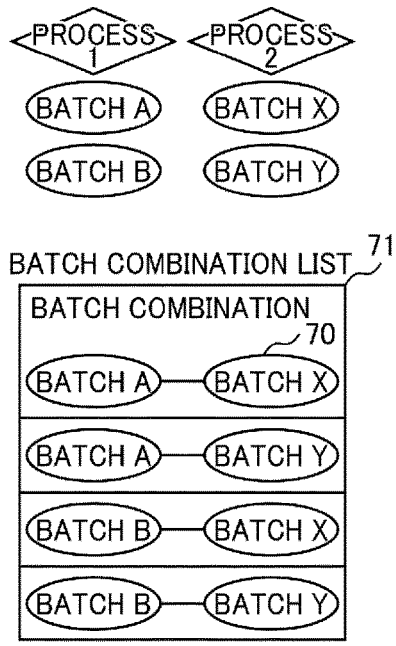
FIG. 23 is a conceptual diagram describing a batch combination and batch joining.

Details of the batch joining method and the batch joining method list are as in FIG. 23. When, for a management number, n batches are provided in one process, and m batches are provided in the other process, n*m combinations are considered as the batch combination. Since the batch joining method indicates a method of combining n batches and m batches, 2^(n*m) combinations in total are considered.

In Step 1243, loop processing for the batch joining method in the batch joining method list created in Step 1242 is performed.

In Step 1244, whether or not the batch joining method extracted in Step 1243 satisfies the restriction condition extracted in Step 1240 is determined. When the batch joining method satisfies the restriction condition, the process proceeds to Step 1245. When batch joining method does not satisfy the restriction condition, this step is performed for the next batch joining method in a loop.

In Step 1245, information on the batch joining method is stored in the batch joinable list 62. The joinable list is generated for each management number.

In Step 1246, the loop processing for the batch joining method in the batch joining method list created in Step 1242 is ended. Thus, it is possible to generate the batch joinable list in which only the candidate satisfying the restriction condition is stored.

In Step 1247, the loop processing for the management number is ended. In Step 1248, pieces of data extracted up to Step 1247 are stored in the batch joinable list 62.

FIG. 23 illustrates a definition for the combination of the batch. A case where the batches A and B are provided in Process 1, and the batches X and Y are provided in Process 2 is considered as an example. As indicated by the reference sign of 70, four batch combinations of (A, X), (A, Y), (B, X), and (B, Y) are provided. Each combination is referred to as "a batch combination". A set including the batch combination, as indicated by the reference sign of 71, is referred to as "a batch combination list". A form of joining the batches A and B in Process 1, and the batches X and Y in Process 2, as indicated by the reference sign of 72, that is, a subset of the batch combination list is referred to as "a batch joining method". As indicated by the reference sign of 73, 16 batch joining methods are provided, and a set of all the batch joining methods, that is, a power set of the batch combination list is referred to as "a batch joining method list".

FIG. 24 is a table diagram showing the batch joinable list 62 for the management number P. The batch joinable list is provided for each management number. Each column name indicates the batch combination, and each row represents the batch join method. A part in which 0 is described corresponds to a case where the batch combination of the column name is not adopted. A part in which 1 is described corresponds to a case where the batch combination of the column name is adopted. For example, the second row indicates a batch joining method in which the batch A and the batch X, the batch A and the batch Y, and the batch B and the batch X are joined to each other, but the batch B and the batch Y are not joined to each other. This list means an output result of the restriction condition processing unit 124. Thus, only the batch joining method as a consideration target is stored.

Figure 25:
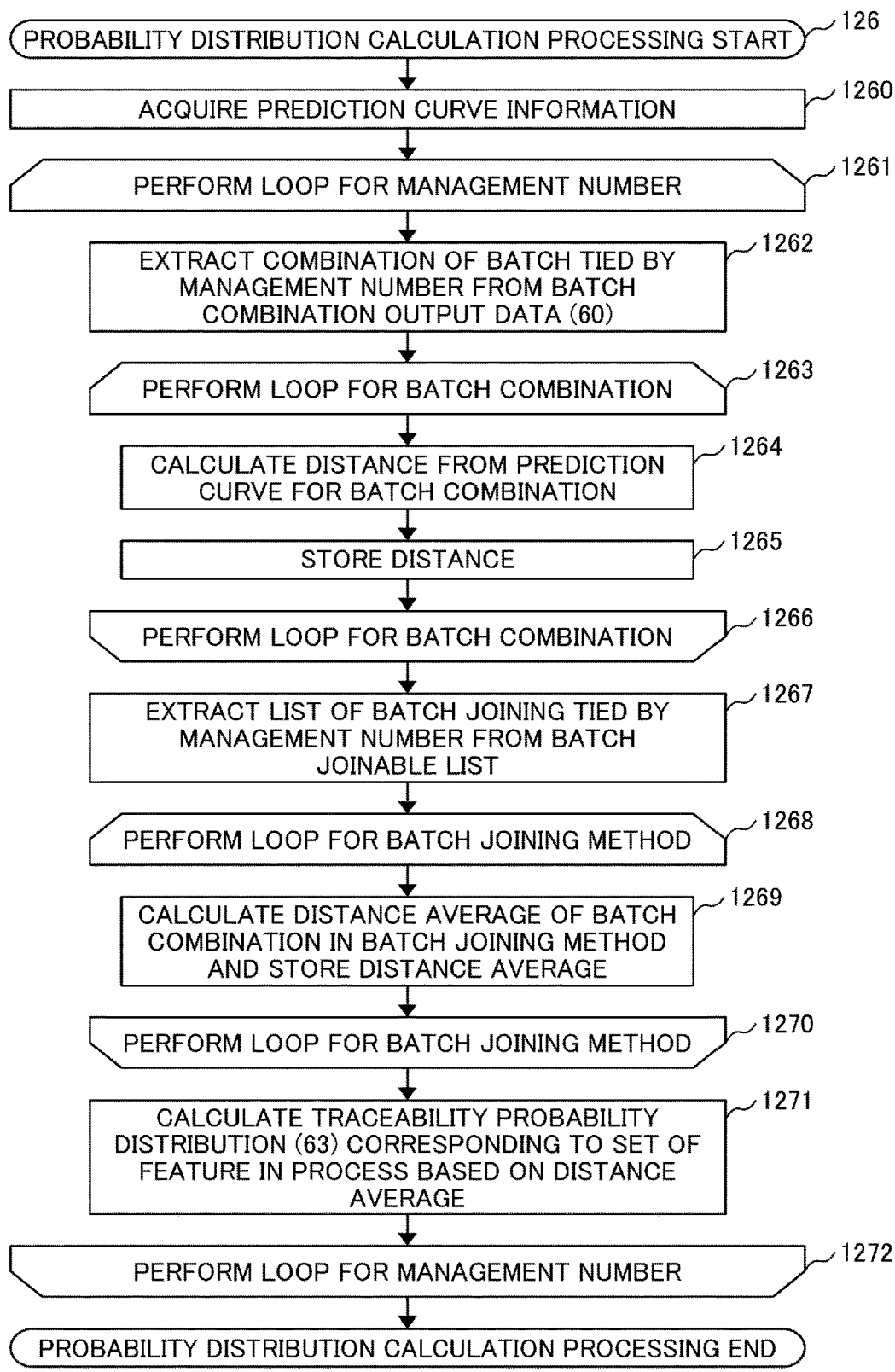
FIG. 25 is a flowchart illustrating probability distribution calculation processing 126 in the traceability estimation unit 12.

FIG. 25 is a flowchart of the probability distribution calculation processing unit and corresponds to a part in which each-feature traceability probability distribution output data 63 corresponding to the process designated in the step and the set of the feature designated in the step is calculated based on the prediction curve output data 61 and the batch joinable list 62 for each management number. The operation based on the flowchart is as follows.

In Step 1260, an expression of a regression curve is extracted from the prediction curve output data 61. In Step 1261, loop processing for the management number is performed.

In Step 1262, a batch combination list corresponding to the management number is extracted from the batch combination output data 60.

In Step 1263, loop processing for the batch combination constituting the batch combination list extracted in Step 1262 is performed.

In Step 1264, the set of the feature corresponding to the batch combination extracted in Step 1263 is extracted. The extracted set of the feature is considered as a point, and a distance from the regression curve extracted in Step 1260 is calculated. For example, a numerical value such as a difference of the feature of the upstream process, a difference of the feature of the downstream process, and the shortest distance from the curve is used.

In Step 1265, the distance for the batch combination, which has been calculated in Step 1264, is stored in a distance storage unit. In Step 1266, the loop processing for the combination of the batches is ended.

In Step 1267, a list of batch joining tied by the designated management number is extracted from the batch joinable list 62. In Step 1268, loop processing for the batch joining method in the batch joinable list 62 is performed. In Step 1269, the batch combination constituting the selected batch joining method is extracted, and a distance corresponding to the batch combination is extracted from the distance storage unit. Then, an average value of the extracted distance is calculated. In Step 1270, the loop processing for the batch joining method in the batch joinable list 62 is ended.

In Step 1271, a probability is calculated for each batch joining method, based on the average of the distance. For example, a probability proportional to the reciprocal of the average of the distance is calculated. In order to describe this method, a case where the averages of the distances of three batch joining methods W1, W2, and W3 from the prediction curve is 4, 5, 6, respectively, is considered. Since a probability proportional to the reciprocal of the average of the distance is considered, the ratio of the probabilities of the batch joining methods W1, W2, and W3 is 1/4:1/5:1/6 in order. It is possible to calculate the probability of the batch joining methods W1, W2, and W3 by setting the sum of probabilities of all cases to 1. A combination of the designated feature, the description of the batch joining method, and the calculated probability are stored in the each-feature traceability probability distribution output data 63.

In Step 1272, the loop processing for the management number is ended.

FIG. 26 is a table diagram showing the each-feature traceability probability distribution output data. In particular, FIG. 26 shows a table diagram for the management number P. Each row includes the designated feature, the batch joining method, and the probability. For example, from the third row, it is understood that a probability that the batch joining method in which the batch A in Process 1 is joined to the batches X and Y in Process 2, and the batch B in Process 1 is joined to only the batch Y in Process 2 is correct is 0.55 in consideration based on the feature of the current in Process 1 and the feature of the temperature in Process 2.

Figure 27:
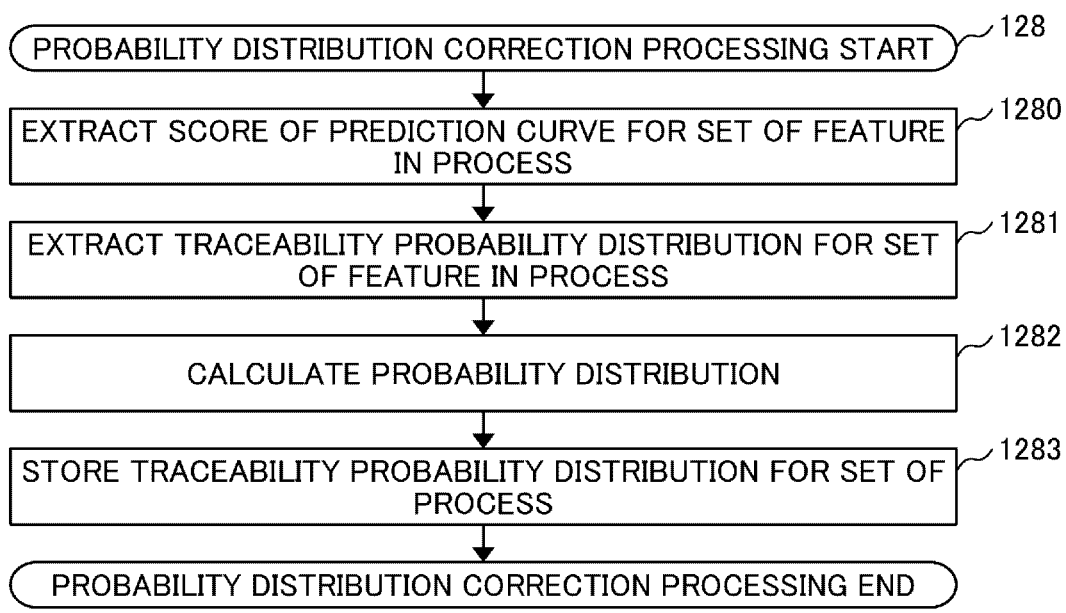
FIG. 27 is a flowchart illustrating probability distribution correction processing 128 in the traceability estimation unit 12.

FIG. 27 is a flowchart of the probability distribution correction unit. The traceability probability distribution data calculated for each set of the feature is integrated into one probability distribution and is output to the traceability probability distribution data 156. The operation based on the flowchart is as follows.

In Step 1280, the score of the prediction curve for the set of the designated feature is extracted from the prediction curve output data 61.

In Step 1281, all pieces of data on the traceability probability distribution for the set of the process are extracted from the each-feature traceability probability distribution output data 63, for each set of the feature. For example, when the four features are provided in Process 1, and five features are provided in Process 2, the 4*5=20 pieces of each-feature traceability probability distribution output data in total may be extracted for each management number and batch joining.

In Step 1282, the traceability probability distribution data for each set of the feature, which has been extracted in Step 1281, is added with a weight proportional to the numerical value of the score of the prediction curve extracted in Step 1280. This part will be described in detail with Expression 1. The completed data is stored in the traceability probability distribution data 156.

In Step 1283, the loop processing for the batch combination is ended.

$$P_{all}(p_1, p_2, M, \text{state}) = \frac{P_{each}(p_1, p_2, fv_1, fv_2, M, \text{state})}{\sum_{fv} \text{score}(p_1, p_2, fv_1, fv_2)} \sum_{fv} \text{score}(p_1, p_2, fv_1, fv_2)$$ [Expression 1]

Expression 1 is used for traceability probability distribution correction. A variable p1 indicates the name of the upstream process, and a variable p2 indicates the name of the downstream process. A variable fv1 indicates the name of the feature in the upstream process, and a variable fv2 indicates the name of the feature in the downstream process. A variable M indicates the management number. A variable state indicates the state of batch joining and is expressed in a binary manner. P_each is defined for six variables being two process names, the feature of each process, the management number, and the state of batch joining and assigns the probability. P_all is a function of assigning probabilities to four variables being two process names, the management number, and the state of batch joining.

Score is a function of assigning the score of the corresponding prediction curve to four variables being two process names and the features of the processes. This expression is an expression of calculating the traceability probability distribution data by adding the probability distribution obtained for each combination of the feature with the score of the prediction curve as the weight. With the above description, the generation of the traceability probability distribution data is completed.

Last, the analysis unit 13 performs an analysis using the traceability probability distribution data 156, and the result is output to the visualization unit 14. In Embodiment 1, firstly, a part of an analysis of determining the traceability will be described. The traceability may be determined for each management number, by adopting the batch joining method having the highest probability.

Figure 30:
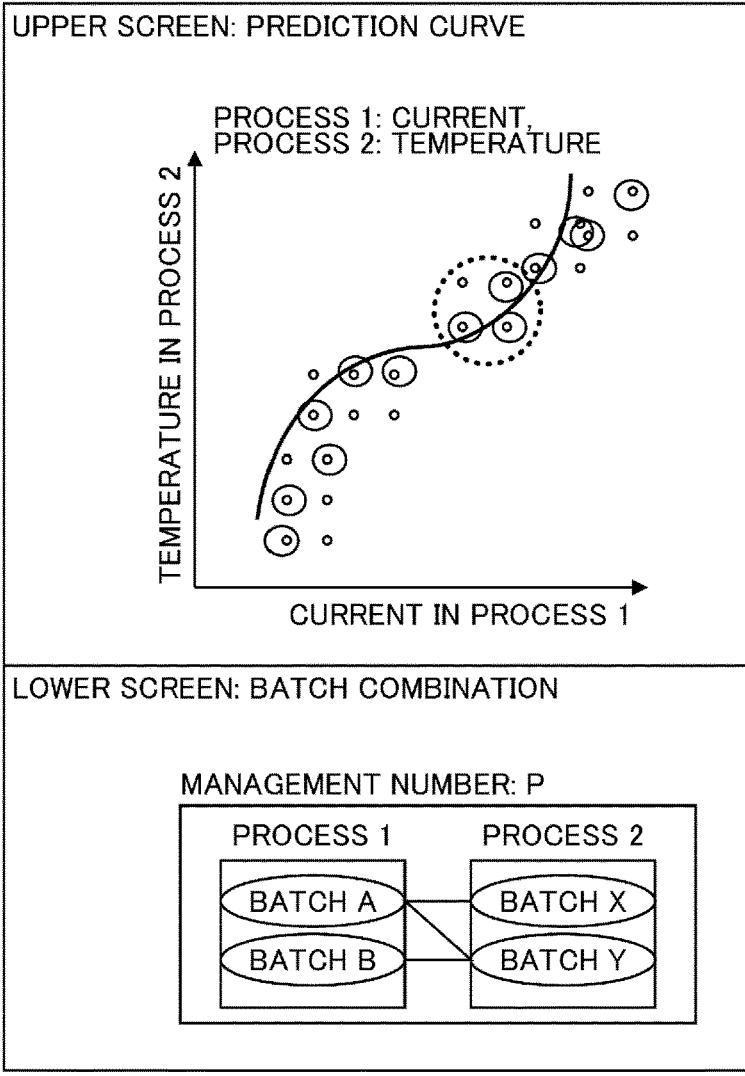
FIG. 30 is a diagram illustrating a display screen in a visualization unit 14 in Embodiment 1 and illustrates a screen on which an analysis result by traceability determination analysis processing 132 is displayed.

FIG. 30 illustrates a display screen in the visualization unit 14.

In the processes to be compared to each other and a display screen 25, on an upper screen, if the features of two processes are selected, the prediction curve corresponding to the set of the feature, all batch combinations of each management number, and a graph after the batch joining having the highest probability is adopted are displayed. On the display screen 25, on a lower screen, if the management number is selected, the diagram of the batch joining for the management number is displayed. For example, on the upper screen of the display screen 25, a prediction curve calculated for the current in Process 1 and the temperature in Process 2 is displayed with a solid line, and the adopted batch combination is displayed with being circled.

Such a display is an example. In practice, the number of points becomes very large. Thus, the color of the adopted batch combination and the color of the unselected batch combination are displayed differently. On the lower screen of the display screen 25, it is indicated that the batch joining method in which, in the management number P, the batch A in Process 1 is joined to the batches X and Y in Process 2, and the batch B in Process 1 is joined to the batch Y in Process 2 is adopted.

Embodiment 2

An example in which the traceability is not determined only by the top one, but a wider range is examined by a threshold value manually provided in the analysis unit 13 in Embodiment 1 will be described. Embodiment 2 is similar to Embodiment 1 up to the part of generating the traceability probability distribution data 156.

If all possibilities are considered for returning to the previous process when a defect in quality occurs and an abnormality factor analysis is performed, a huge number of batch combinations are examined, and this requires a great deal of labor. If the batch combinations are narrowed down to one as in Embodiment 1, extraction omission occurs when the probability of the second or lower case, and thus the accurate analysis is not possible. To solve this problem, only the main batch joining is extracted in accordance with the flowchart illustrated in FIG. 28. Further, the abnormality factor analysis is performed using the extracted batch joining.

In Step 1320, one or more batch joining methods having a high probability are selected by a manually determined threshold value. For example, a combination having a probability that is equal to or more than 15% is selected. According to FIG. 11, the second row and the fourth row are adopted.

In Step 1321, batch joining selection in Step 1320 is applied to all items in the traceability probability distribution data 156.

Thus, it is possible to narrow the target down to only the batch joining having a high probability. Then, the abnormality factor analysis is performed.

In Step 1330, an abnormal batch as an examination target is selected in the downstream process.

In Step 1331, the abnormal batch designated in Step 1330 is traced back to the batch in the upstream process based on the processing in the traceability determination analysis processing unit.

In Step 1332, the feature of the batch extracted in Step 1331 is examined.

Figure 31:
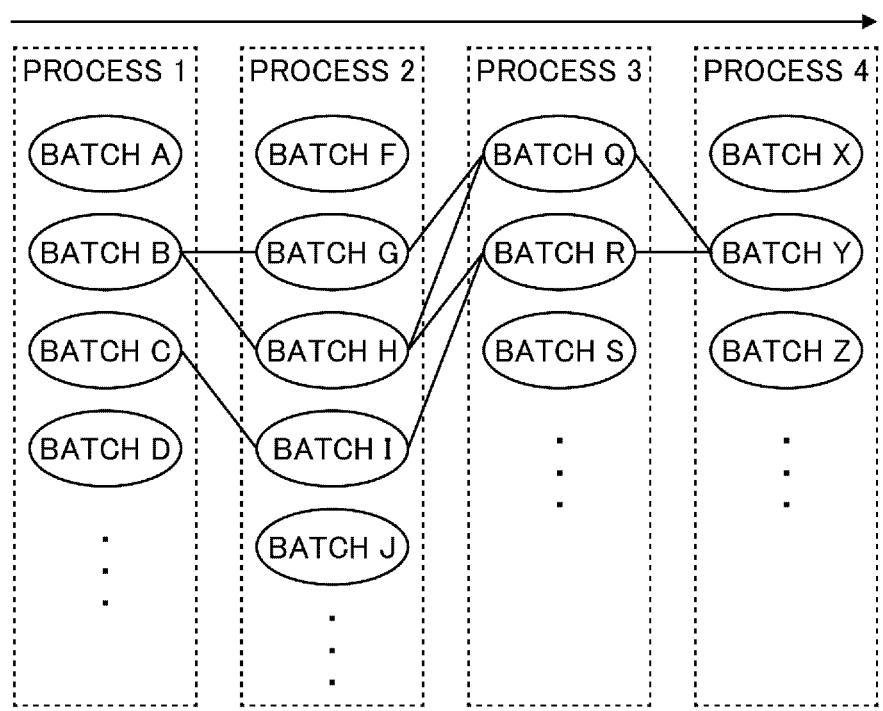
FIG. 31 is a diagram describing processing in Embodiment 2.

FIG. 31 is a diagram illustrating an outline of the method in Embodiment 2. Firstly, an abnormal batch as an examination target is determined, and is traced back to the batch having a possibility based on the probability distribution. From FIG. 31, it is understood that, in order to examine an abnormality factor of the batch Y in Process 4, a batch Q and a batch R in Process 3, a batch G, a batch H, and a batch I in Process 2, and a batch B and a batch C in Process 1 may be examined.

If extraction of a part different from other batches with the features of the batches is possible, it is possible to exemplify the feature as the candidate for the abnormality factor. For example, if it is understood that the batch B and the batch C in Process 1 have a higher outdoor temperature than the batch A and batch D, it is possible to estimate that "if the outdoor temperature is high in Process 1, abnormality occurs in Process 4".

Embodiment 3

A case where the analysis unit 13 in Embodiment 1 performs a weighting regression analysis using the numerical value itself of the probability distribution without determining the traceability will be described. Embodiment 2 is similar to Embodiment 1 up to the part of generating the traceability probability distribution data 156.

Figure 29:
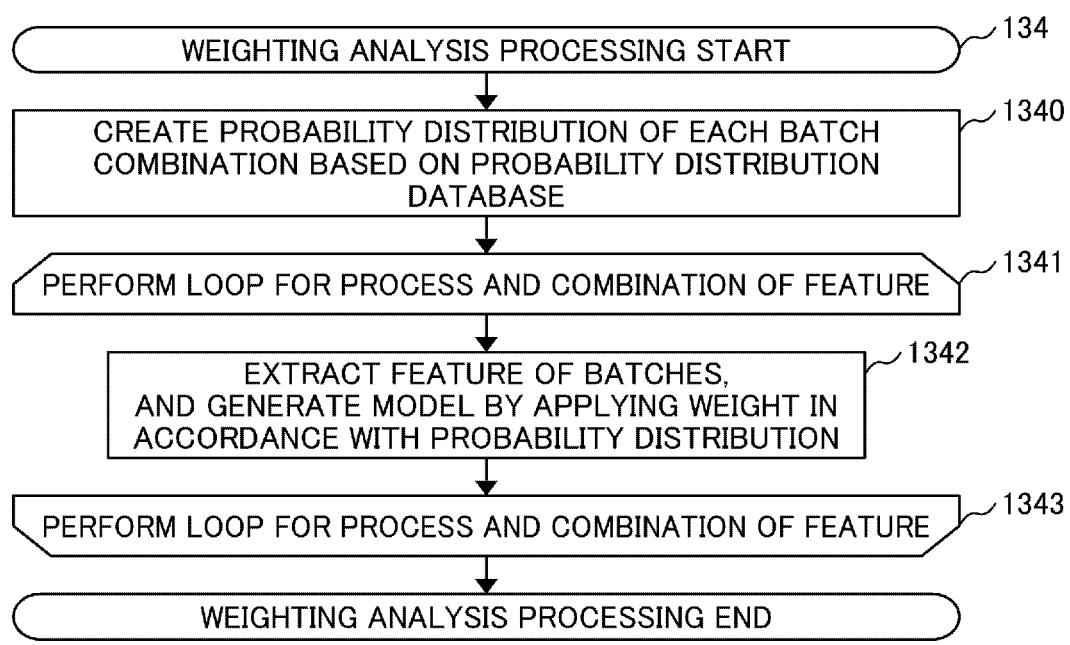
FIG. 29 is a flowchart illustrating weighting analysis processing 134 in an analysis unit 13 according to Embodiment 3.

FIG. 29 is a flowchart of the weighting analysis unit 134 in the analysis unit 13 and is a flowchart of performing a regression analysis with a probability described in the traceability probability distribution data 156 as one feature. The operation based on the flowchart is as follows.

In Step 1340, an adoption probability of each batch combination is calculated based on the traceability probability distribution data. As the calculation method, probabilities are multiplied by the values in the columns and the resultants are added. For example, in the case of FIG. 11, a probability of joining the batch A and the batch X to each other is 0.96 because the values from the first row to the fourth row and the values from the sixth row to the seventh row are added. A probability of joining the batch B and the batch Y to each other is 0.36 because the value in the first row and the values from the third row to the fifth row are added.

Step 1341: loop processing for the process and the set of the feature is performed.

Step 1342: a prediction curve is calculated for the process and the set of the feature designated in Step 1341, by a method similar to the model generation unit 122. When the regression equation of the prediction curve is determined, the parameters are determined by the least-squares method. However, when the distance from the prediction curve is calculated by the least-squares method, the probability calculated in Step 1340 is multiplied as a weight.

$$J_1 = \sum_B (x_B - f(x_B))^2 \qquad \text{[Expression 2]}$$

$$J_2 = \sum_B p_B(x_B - f(x_B))^2$$

f: 予測曲線の回帰式
B: バッチ組み合わせ
$p_B$: バッチ組み合わせ
$x_B$: に対応する確率 バッチ組み合わせに対する工程1での特徴量

(f: regression equation of prediction curve
B: batch combination
$p_B$: probability corresponding to batch combination
$x_B$: feature in Process 1 for batch combination)

Expression 2 is a mathematical expression related to the calculation of the parameter in Step 1342.

In Step 1343, the loop processing for the process and the set of the feature is ended.

Figure 32:
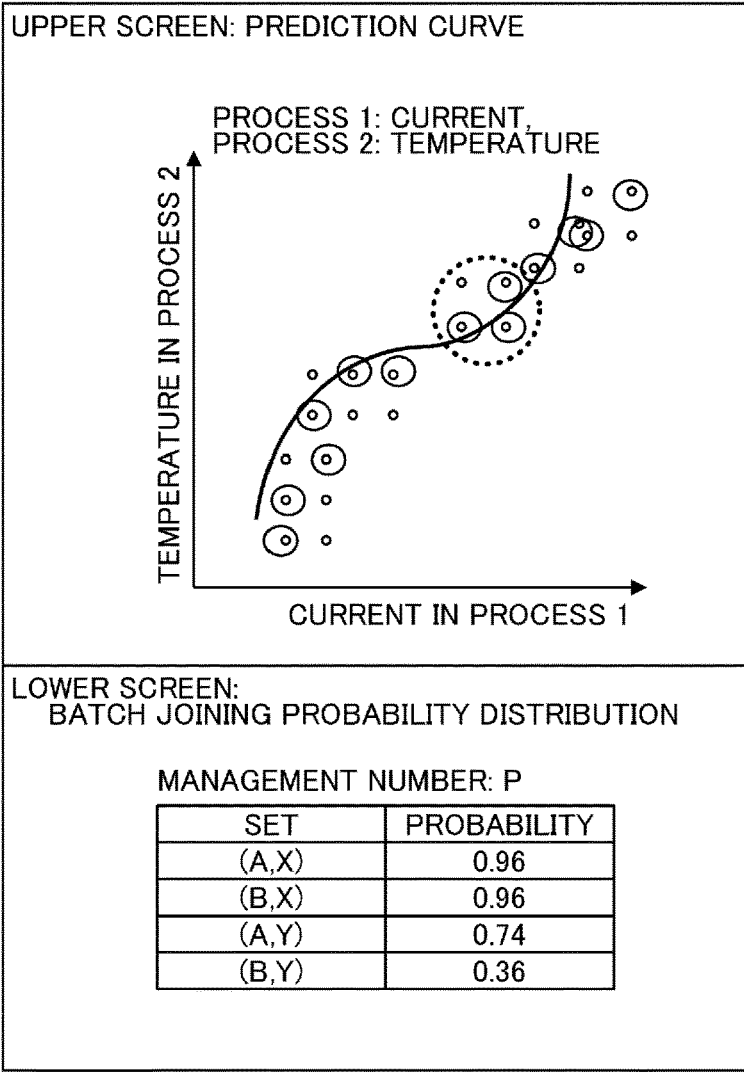
FIG. 32 is a diagram illustrating a display screen in a visualization unit 14 in Embodiment 3 and illustrates a screen on which an analysis result by the weighting analysis processing 134 is displayed.

Display of the graph in the visualization unit 14 is as in FIG. 32. The above-described analysis is performed by selecting "the weight" in an analysis method part in an input. Since the rough outline of the display screen 25 is similar to that in Embodiment 1, only a difference will be described. A color is changed and output in accordance with the probability on the upper screen. On the lower screen, a joining pair is displayed in accordance with the probability obtained by calculation in Step 1340, in order of a high probability.

Embodiment 4

The case of re-analyzing the correlation of the feature between the processes based on the traceability determined in the analysis in Embodiment 1 will be described. FIG. 33 is a functional block diagram illustrating the traceability estimation system according to Embodiment 4.

After the batch combination is determined with a method similar to that in Embodiment 1, the feature corresponding to the determined combination is plotted again, and the model generation unit 122 in the traceability estimation unit 12 calculates the prediction curve.

Since the batch combination is determined, and then the prediction curve is calculated, it is possible to calculate the prediction curve having higher accuracy. Further, it is possible to find the correlation of the feature which has been unclear until then, based on this result.

Figure 34:
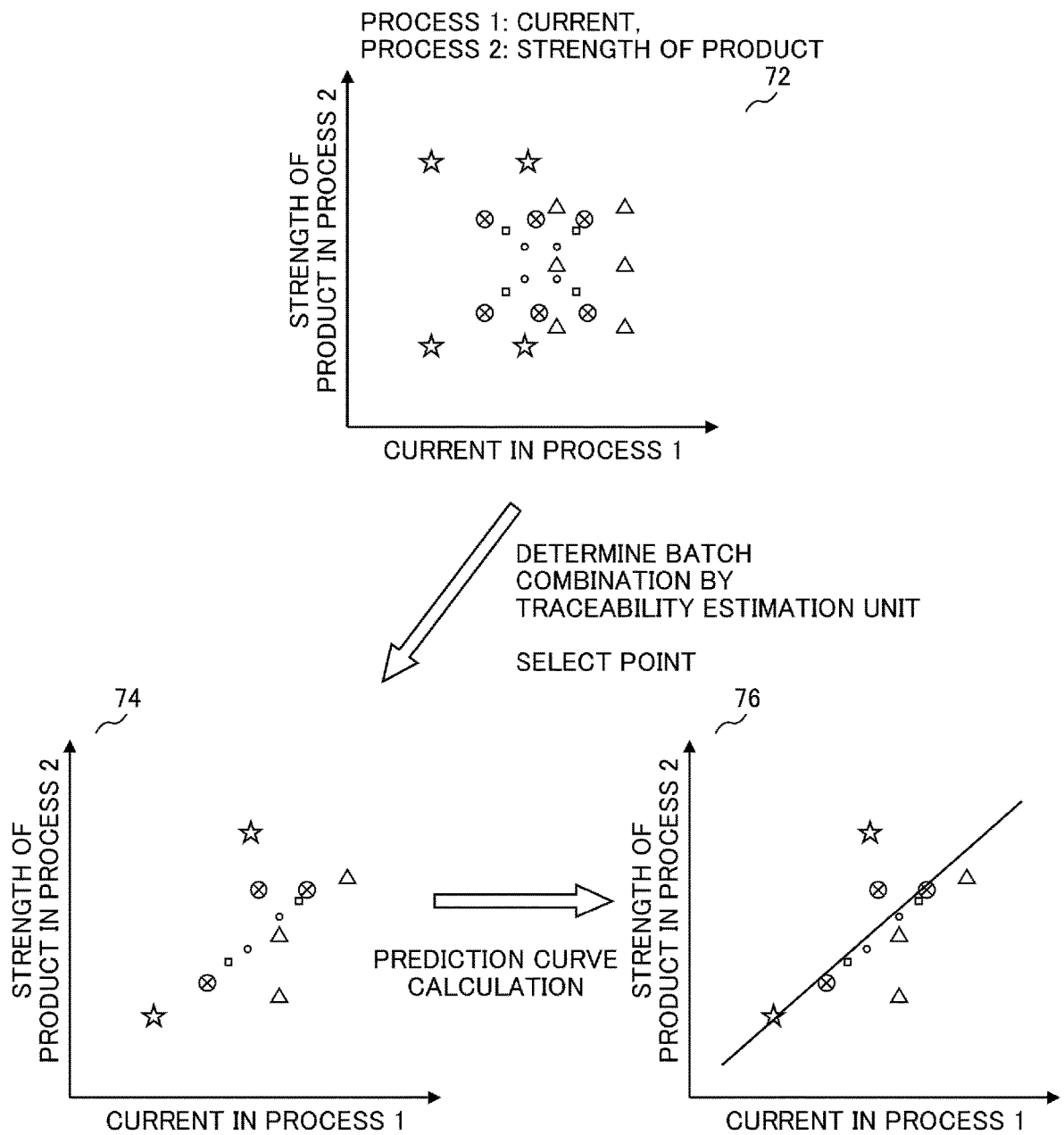
FIG. 34 is a conceptual diagram illustrating a form of plural times of analysis in Embodiment 4.

FIG. 34 is a conceptual diagram illustrating a form of plural times of analysis in Embodiment 4.

The reference sign of 72 indicates a state considering all batch combinations and indicates a state where the correlation between the charge amount in Process 1 and the strength of a product in Process 2 is completely unknown.

If, with the method in Embodiment 1, the batch combination is determined, and the plotting is performed again, a graph as indicated by the reference sign of 74 is obtained. If the prediction curve is calculated based on this graph, a graph as indicated by the reference sign of 76 is obtained.

As described above, according to Embodiment 4, it is possible to find a point that "the charge amount and the strength of a product have positive correlation", which has been unknown in the past.

Figure 35:
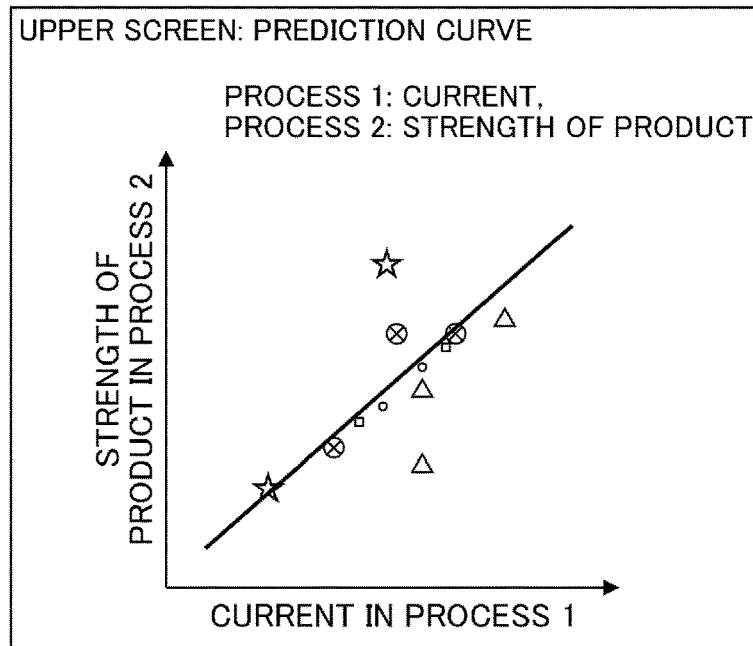
FIG. 35 is a diagram illustrating a display screen in a visualization unit 14 in Embodiment 4 and illustrates a screen on which an analysis result when the plural times of analysis are performed is displayed.

FIG. 35 is a diagram illustrating the display screen in the visualization unit 14 in Embodiment 4 and illustrates a screen on which an analysis result when the plural times of analysis are performed is displayed.

Display of the graph in the visualization unit 14 is as in FIG. 35. The above-described analysis is performed by selecting "plural times" in an analysis method part in an input. On the display screen 25, on the upper screen, the prediction curve obtained by the second analysis is output. On the display screen 25, the description about the correlation of the input set of the feature is output on the lower screen.

As described above, the traceability estimation system in Embodiment 4 includes the traceability estimation unit 12 that estimates the traceability by performing a first analysis and a second analysis.

In the first analysis, the traceability estimation unit 12 uses the set of the batch for each process in the management number unit, as an input, extracts all batch combinations under the management number, and plots the feature corresponding to the batch combination for all the management numbers.

After the batch combination is selected and determined, the feature corresponding to the determined combination of the batch is plotted again, and the prediction curve is calculated. Then, the set of batch joining is narrowed down based on the distance from the prediction curve.

In the second analysis, the traceability estimation unit 12 generates predetermined process information based on the set of the batch joining narrowed in the first analysis.

In the second analysis, the correlation of the feature between the processes is determined using the predetermined process information, and all the processes are analyzed.

The visualization unit 14 displays the prediction curve and the correlation of the feature between the processes.

According to Embodiment 4, since the batch combination is determined, and then the prediction curve is calculated, it is possible to calculate the prediction curve having higher accuracy. Further, it is possible to find the correlation of the feature which has been unclear until then, based on this result.

In the above embodiments, the prediction curve is generated based on the management number in a large frame, considering all batch combinations to be considered. The probability distribution of each joining method is given based on the distance from the prediction curve obtained here and the method of tying the batch with the restriction condition.

Thus, in determination of the traceability of the different process, it is possible to determine the detailed traceability in a case where individual management is not performed, and management is performed for each unit of work. That is, it is possible to determine the details of the correspondence of the work between different processes in "a case where it is not ensured that the batch sequence is arranged in time series" or "a case where the batch correspondence is many-to-many", in a product of which individual management is not possible.

What is claimed is:

1. An analysis system comprising:
   a memory; and
   a processor configured to:
   estimate traceability,
   wherein in traceability data configured by a relation between batches tied by a management number, a process, a batch in each process, and a feature of the batch are associated with each other,
   wherein the process includes a first process and a second process, and
   wherein the processor is further configured to:
   generate batch combination output data configured by a plurality of combinations of a batch in the first process and a batch in the second process, and the feature of the batch, and
   estimate the combination of the batch in the first process and the batch in the second process, which is used as traceability, from the plurality of the combinations of the batches in the batch combination output data by using the feature.

2. The analysis system according to claim 1,
   wherein each of the first process and the second process includes a plurality of batches,
   the plurality of the combinations of the batch in the first process and the batch in the second process are created,
   a combination of the features of the batches corresponding to the combination of the batches between the processes is created, the appropriate combination of the features of the batches is selected from a prediction line by using a plurality of combinations of the features of the plurality of the batches, and the traceability is estimated by setting the combination of the batches corresponding to the selected combination of the features of the batches, to an appropriate combination.

3. The analysis system according to claim 2, wherein the prediction line is generated to pass by a vicinity of the combination of the features of the plurality of batches, and the combination of the features of the batches in the vicinity of the prediction line is selected under a condition that one batch in the first process and one batch in the second process are associated with each other.

4. The analysis system according to claim 1, wherein the estimated traceability has probability distribution of the combination of the batches.

5. The analysis system according to claim 1, wherein the process includes a third process, and in the estimation of the traceability, a combination of the batch in the first process, the batch in the second process, and a batch in the third process is estimated.

6. The analysis system according to claim 1, wherein the batch in the first process and the batch in the second process include time information, and the batch combination output data is restricted using the time information or an order based on the time information.

7. The analysis system according to claim 1, wherein the processor is further configured to:

perform a factor analysis based on the combination of the batches in the estimated traceability and the features of the corresponding batches.

8. The analysis system according to claim 7, wherein the processor is configured to perform an abnormality factor analysis by selecting an abnormal batch in the downstream second process, extracting the batch in the upstream first process from the selected batch based on data of the estimated traceability, and analyzing the feature of the extracted batch in the first process.

9. The analysis system according to claim 7, wherein the estimated traceability has probability distribution of the combination of the batches, and the processor is configured to perform a weighting analysis for performing the factor analysis, in a state where a weight depending on a probability of the combination of the batches is given.

10. The analysis system according to claim 9, further comprising:

a visualization unit that displays an analysis result obtained by an analysis of the processor, and the visualization unit displays a prediction line and the combination of the batches, as the analysis result.

11. The analysis system according to claim 1, wherein the processor is further configured to:

generate the traceability data and feature data based on production management information data measured in each process and sensor data acquired from a sensor installed in each process.

12. An analysis system comprising:

a memory; and a processor configured to:

estimate traceability; and perform an analysis, wherein in traceability data configured by a relation between batches tied by a management number, a process, a batch in each process, and a feature of the batch are associated with each other, and wherein the processor is further configured to estimate the traceability being a combination of batches in different processes, by using a feature of the batch, and perform a factor analysis with a relation between the batches in the different processes in the estimated traceability, and the feature of each batch.

* * * * *